US012795415B2

(12) United States Patent
Bi et al.

(10) Patent No.: US 12,795,415 B2
(45) Date of Patent: Nov. 10, 2026

(54) BEAM DIRECTION OF UE-BASED SENSING SIGNAL REQUEST

(71) Applicant: HUAWEI TECHNOLOGIES CO., LTD., Shenzhen (CN)

(72) Inventors: Xiaoyan Bi, Shenzhen (CN); Jianglei Ma, Kanata (CA); Dageng Chen, Kanata (CA); Wen Tong, Kanata (CA); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 18/328,247

(22) Filed: Jun. 2, 2023

(65) Prior Publication Data

US 2023/0379735 A1 Nov. 23, 2023

Related U.S. Application Data

(63) Continuation of application No. PCT/CN2020/139123, filed on Dec. 24, 2020.

(51) Int. Cl.
*H04W 24/08* (2009.01)
*H04B 7/06* (2006.01)
*H04W 24/10* (2009.01)

(52) U.S. Cl.
CPC ........ *H04W 24/08* (2013.01); *H04B 7/06952* (2023.05); *H04W 24/10* (2013.01)

(58) Field of Classification Search
CPC .. H04W 24/08; H04W 24/10; H04B 7/06952; H04B 7/0641
See application file for complete search history.

(56) References Cited

U.S. PATENT DOCUMENTS 5,200,755 A 4/1993 Matsuda et al.
2019/0356524 A1 11/2019 Yi et al.
2020/0028565 A1 1/2020 Rune et al.
2020/0092911 A1 3/2020 Li et al.
2020/0212988 A1 7/2020 Lim et al.
2020/0275402 A1* 8/2020 Shi ........................ H04W 16/28
2021/0116542 A1* 4/2021 Tsuji .................... G08B 13/181
2022/0099785 A1* 3/2022 Priyanto ............... G01S 5/0244
2023/0155663 A1* 5/2023 Li ........................ H04B 7/0695
342/52
2023/0379735 A1* 11/2023 Bi ......................... G01S 13/426
2024/0098519 A1* 3/2024 Dutta .................... H04W 16/28
2025/0151045 A1* 5/2025 Stefanatos ............ H04W 72/12
2026/0089686 A1* 3/2026 Kim ...................... H04W 68/02

FOREIGN PATENT DOCUMENTS

CN 108024363 A 5/2018

* cited by examiner

*Primary Examiner* — Deepa Belur
(74) *Attorney, Agent, or Firm* — Slater Matsil, LLP

(57) ABSTRACT

Some embodiments of the present disclosure provide for configuration of a sensing signal on the basis of received information regarding a preferred direction or index of sensing signal. The configured sensing signal may be indicated to another device using a predetermined coordinate system. The indication may be transmitted over a communication link ahead of the transmission of the sensing signal.

16 Claims, 26 Drawing Sheets

1500

| | ① | ② | ③ | ④ | ⑤ | ⑥ |
|---|---|---|---|---|---|---|
| TRANSMIT SIDE | TRP 170A | TRP 170A | TRP 170A | UE 110a | UE 110b | UE 110a |
| RECEIVE SIDE | TRP 170A | TRP 170B | UE 110a | TRP 170A | UE 110b | UE 110b |
| SENSING MODE | MONOSTATIC | BISTATIC | BISTATIC | BISTATIC | MONOSTATIC | BISTATIC |
| COMMUNICATION LINK | DL OR S/FD | S/FD | DL | UL | UL OR S/FD OR SL | SL |
| SENSING NODE | TRP 170A | TRP 170B | UE 110a | TRP 170A | UE 110b | UE 110b |
| AIR INTERFACE | TRP TRANSMITS SENSING SIGNALS IN AN OCCASION | | TRP CONFIGURES THE SENSING SIGNAL TO UE AND UE BEHAVIOR FOR RECEPTION. TRP TRANSMITS A SENSING SIGNAL TO UE AS AN ILLUMINATION SIGNAL. | TRP CONFIGURES THE SENSING SIGNAL TO UE AND GRANTS UE TO TRANSMIT SENSING SIGNAL. UE TRANSMITS SENSING SIGNAL. | | BS CONFIGURES THE SENSING SIGNAL TO UE AND GRANTS UE TO SEND SENSING SIGNAL AT SIDELINK UE SENDS SIDELINK SIGNAL |
| | | | DL-BASED SENSING | UL-BASED SENSING | | SIDELINK-BASED SIGNALING |

FIG. 15

BEAM DIRECTION OF UE-BASED SENSING SIGNAL REQUEST

CROSS REFERENCE

This application is a continuation of International Application No. PCT/CN2020/139123, filed on Dec. 24, 2020, the disclosure of which is hereby incorporated by reference in its entirety.

TECHNICAL FIELD

The present disclosure relates generally to sensing assisted MIMO and, in particular embodiments, to beam direction of UE-based sensing signal request.

BACKGROUND

During communication between a transmit receive point (TRP) and a user equipment (UE), it is known that there are benefits to the TRP and the UE obtaining information about the environment in which their communication is taking place. To this end, it is known for either the TRP or the UE, or both devices, to introduce sensing signals to the environment and then processes received reflections of the sensing signals from elements in the environment. While it is beneficial for the TRP and the UE to work together in the task of sensing the environment, the communication between the TRP and the UE, related to measurement and training to coordinate the sensing, may be shown to introduce overhead to the task. Unfortunately, a consequence of the measurement and training is to introduce latency to the task of sensing the environment.

SUMMARY

Some embodiments of the present disclosure provide for configuration of a sensing signal on the basis of received information regarding a preferred direction or index of sensing signal. The configured sensing signal may be indicated to another device, with the configuration expressed using a predetermined coordinate system. The indication may be transmitted over a communication link ahead of the transmission of the sensing signal.

A coordinate system, used in aspects of the present application to indicate specific beam directions, establishes an explicit linkage between physical environment and beam. Unlike known indication methods, wherein only limited beam directions in a reference beam set can be indicated, aspects of the present application related to use of the predetermined coordinate system may be shown to allow for indicating of, theoretically, any beam direction. Aspects of the present application reduce a reliance upon beam pre-training and pre-measurement, thereby reducing overhead and, consequently, the latency that is attributable to the overhead.

According to an aspect of the present disclosure, there is provided a method. The method includes receiving a sensing request, the sensing request including an indication of a beam direction for a sensing signal, the indication using coordinate information, the coordinate information expressed relative to a predefined coordinate system and receiving the sensing signal transmitted using the beam direction.

According to another aspect of the present disclosure, there is provided a device. The device includes a memory storing instructions and a processor. The processor is configured, by executing the instructions, to receive a sensing request, the sensing request including an indication of a beam direction for a sensing signal, the indication using coordinate information, the coordinate information expressed relative to a predefined coordinate system and receive the sensing signal transmitted using the beam direction.

According to a further aspect of the present disclosure, there is provided a method. The method includes receiving a sensing request, the sensing request including an indication of a downlink beam direction for a downlink sensing signal, the indication using coordinate information, the coordinate information expressed relative to a predefined coordinate system and transmitting an uplink sensing signal transmitted using an uplink beam direction, the uplink beam direction derived from the downlink beam direction.

According to a still further aspect of the present disclosure, there is provided a device. The device includes a memory storing instructions and a processor. The processor is configured, by executing the instructions, to receive a sensing request, the sensing request including an indication of a downlink beam direction for a downlink sensing signal, the indication using coordinate information, the coordinate information expressed relative to a predefined coordinate system and transmit an uplink sensing signal transmitted using an uplink beam direction, the uplink beam direction derived from the downlink beam direction.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 15 presents a table summarizing aspects of the six sensing scenarios presented in FIG. 5;

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
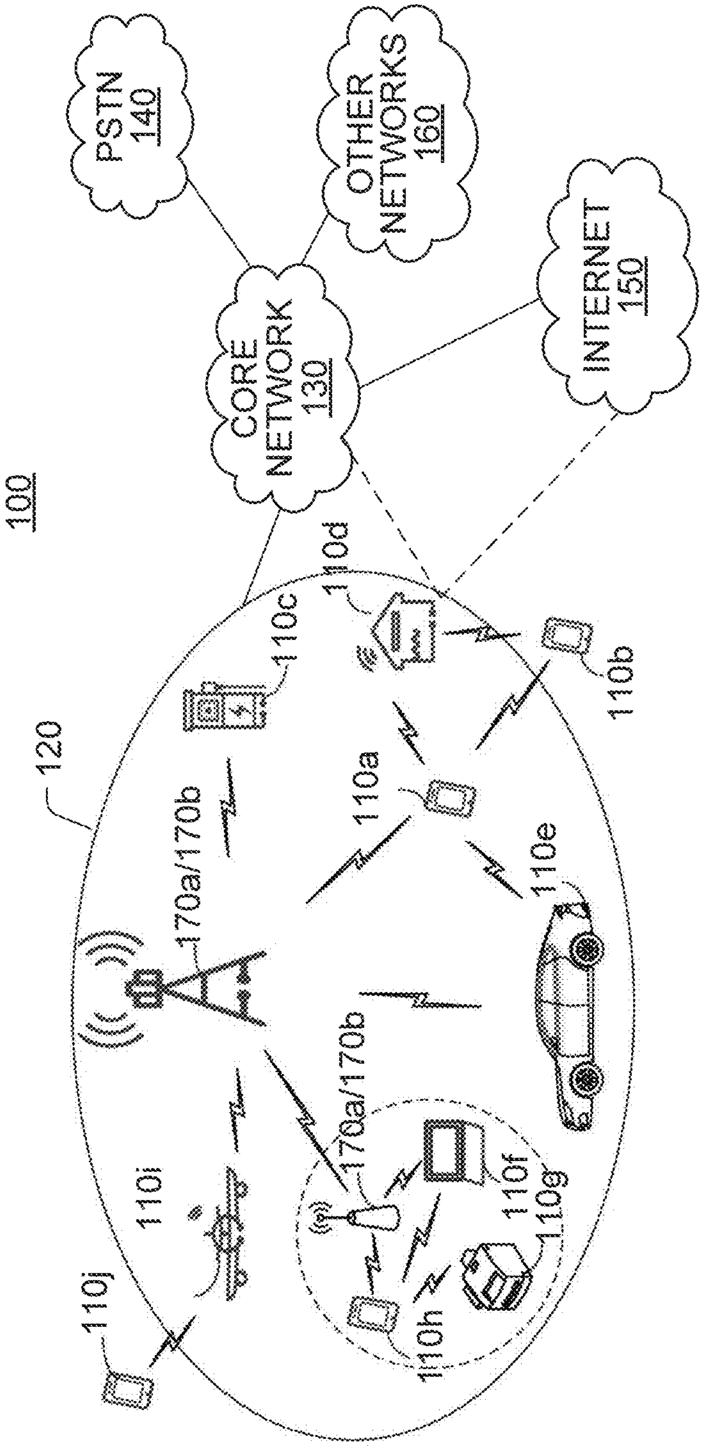
FIG. 1 illustrates, in a schematic diagram, a communication system in which embodiments of the disclosure may occur, the communication system includes multiple example electronic devices and multiple example transmit receive points along with various networks.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
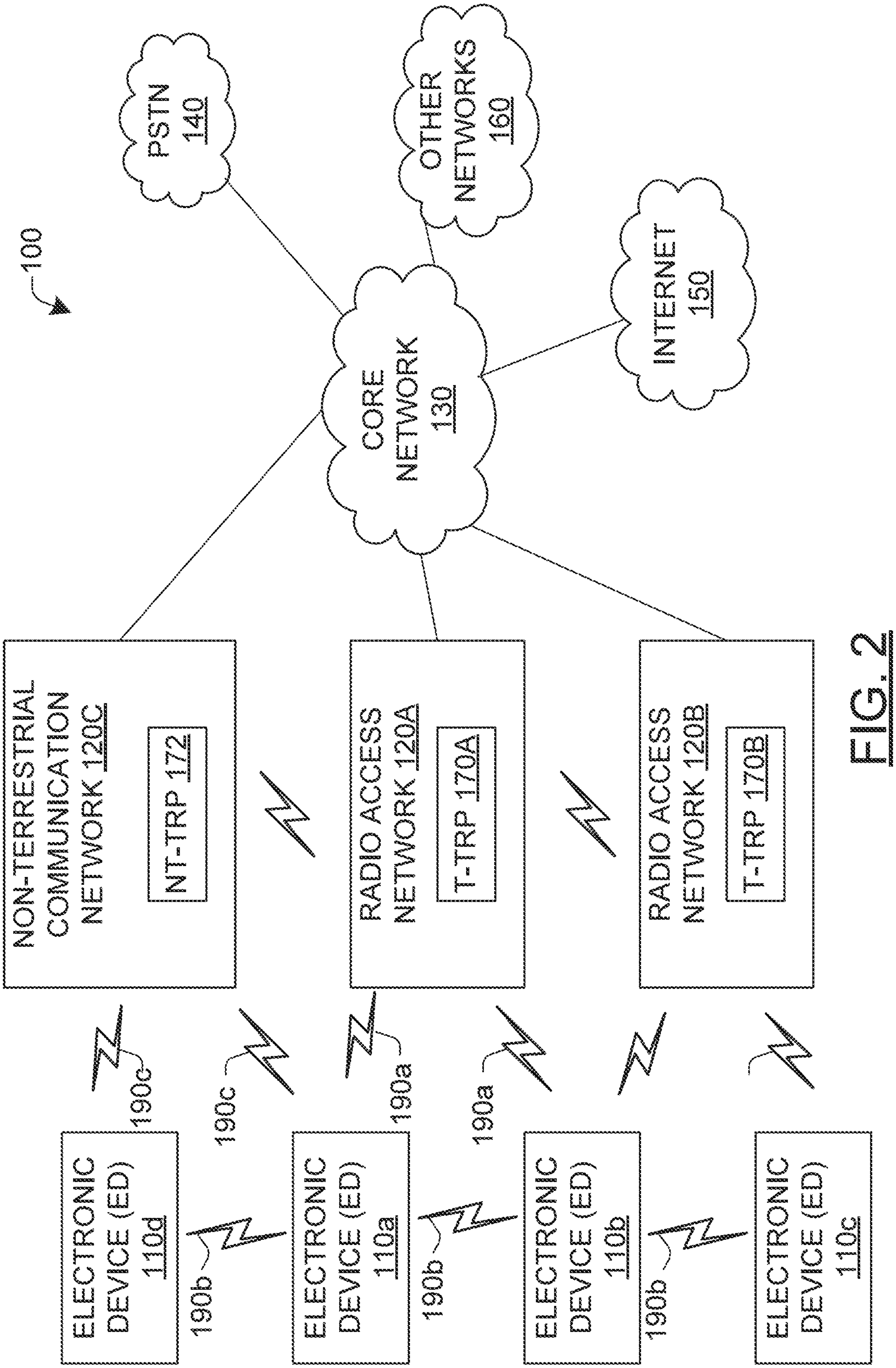
FIG. 2 illustrates, in a block diagram, the communication system of FIG. 1, the communication system includes multiple example electronic devices, an example terrestrial transmit receive point and an example non-terrestrial transmit receive point along with various networks.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over a non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

Figure 3:
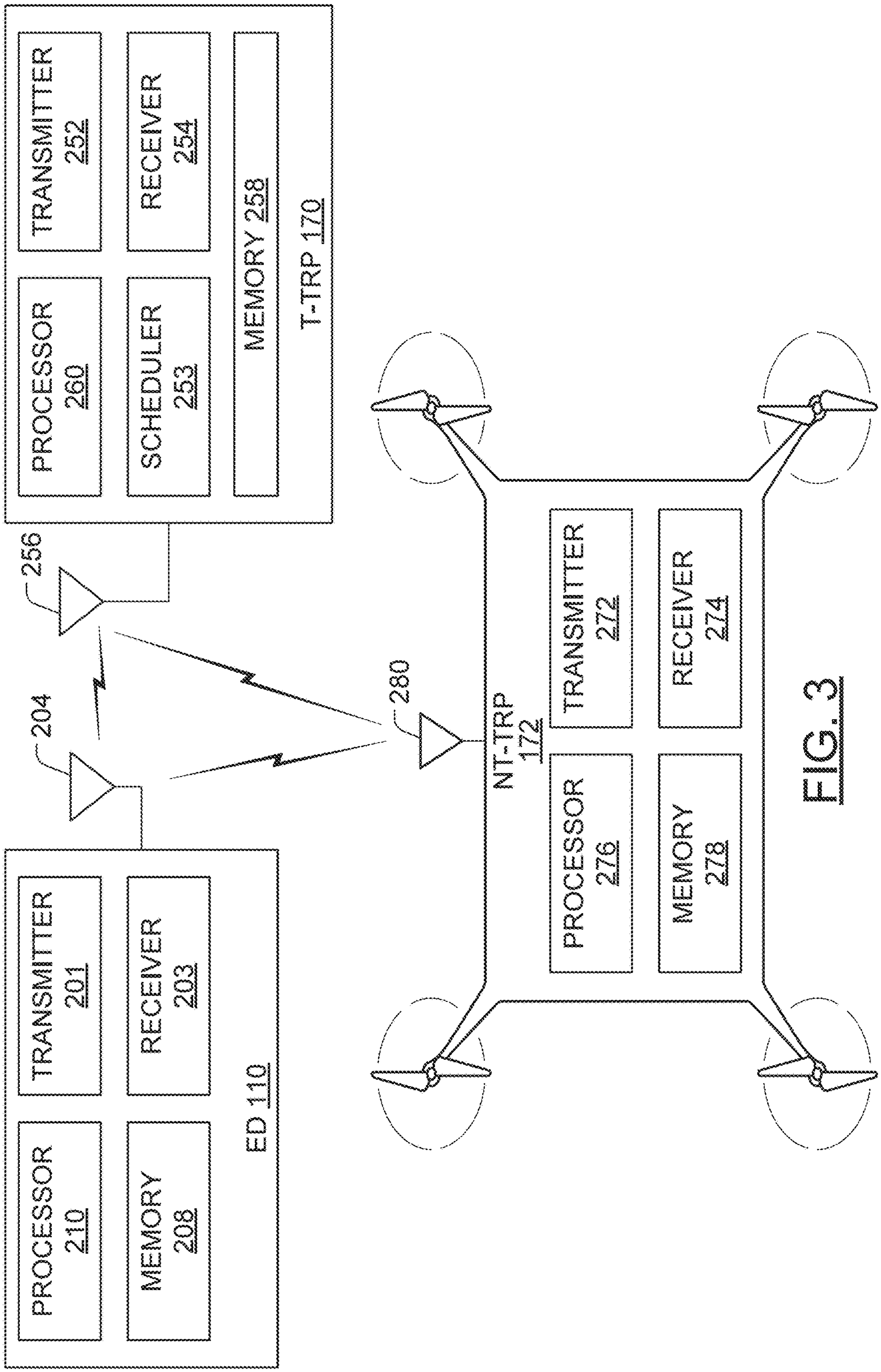
FIG. 3 illustrates, as a block diagram, elements of an example electronic device of FIG. 2, elements of an example terrestrial transmit receive point of FIG. 2 and elements of an example non-terrestrial transmit receive point of FIG. 2, in accordance with aspects of the present application.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random-access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output, “MIMO,” precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that “signaling,” as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free (“configured grant”) resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
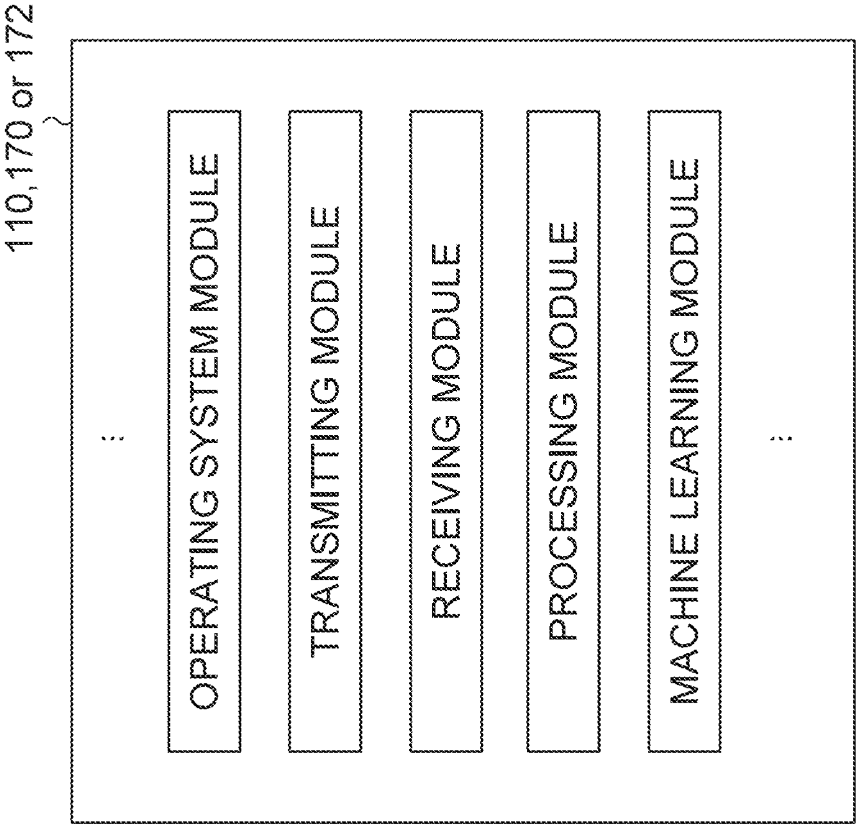
FIG. 4 illustrates, as a block diagram, various modules that may be included in an example electronic device, an example terrestrial transmit receive point and an example non-terrestrial transmit receive point, in accordance with aspects of the present application.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE). The following are some examples for the above components.

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak to Average Power Ratio Waveform (low PAPR WF).

A frame structure component may specify a configuration of a frame or group of frames. The frame structure component may indicate one or more of a time, frequency, pilot signature, code or other parameter of the frame or group of frames. More details of frame structure will be discussed hereinafter.

A multiple access scheme component may specify multiple access technique options, including technologies defining how communicating devices share a common physical channel, such as: TDMA; FDMA; CDMA; SC-FDMA; Low Density Signature Multicarrier CDMA (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources; and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all" concept. For example, it may be that the components within the air interface cannot be changed or adapted once the air interface is defined. In some implementations, only limited parameters or modes of an air interface, such as a cyclic prefix (CP) length or a MIMO mode, can be configured. In some embodiments, an air interface design may provide a unified or flexible framework to support frequencies below known 6 GHz bands and frequencies beyond the 6 GHz bands (e.g., mmWave bands) for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain and a frequency domain self-contained design may support more flexible RAN slicing through channel resource sharing between different services in both frequency and time.

A frame structure is a feature of the wireless communication physical layer that defines a time domain signal transmission structure to, e.g., allow for timing reference and timing alignment of basic time domain transmission units. Wireless communication between communicating devices may occur on time-frequency resources governed by a frame structure. The frame structure may, sometimes, instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource contemporaneously.

One example of a frame structure is a frame structure, specified for use in the known long-term evolution (LTE) cellular systems, having the following specifications: each frame is 10 ms in duration; each frame has 10 subframes, which subframes are each 1 ms in duration; each subframe includes two slots, each of which slots is 0.5 ms in duration; each slot is for the transmission of seven OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD is specified as the integer time of OFDM symbol duration.

Another example of a frame structure is a frame structure, specified for use in the known new radio (NR) cellular systems, having the following specifications: multiple subcarrier spacings are supported, each subcarrier spacing corresponding to a respective numerology; the frame structure depends on the numerology but, in any case, the frame length is set at 10 ms and each frame consists of ten subframes, each subframe of 1 ms duration; a slot is defined as 14 OFDM symbols; and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing, the slot length is 1 ms and, for 30 kHz subcarrier spacing, the slot length is 0.5 ms. The NR frame structure may have more flexibility than the LTE frame structure.

Another example of a frame structure is, e.g., for use in a 6G network or a later network. In a flexible frame structure, a symbol block may be defined to have a duration that is the minimum duration of time that may be scheduled in the flexible frame structure. A symbol block may be a unit of transmission having an optional redundancy portion (e.g., CP portion) and an information (e.g., data) portion. An OFDM symbol is an example of a symbol block. A symbol block may alternatively be called a symbol. Embodiments of flexible frame structures include different parameters that may be configurable, e.g., frame length, subframe length, symbol block length, etc. A non-exhaustive list of possible configurable parameters, in some embodiments of a flexible frame structure, includes: frame length; subframe duration; slot configuration; subcarrier spacing (SCS); flexible transmission duration of basic transmission unit; and flexible switch gap.

The frame length need not be limited to 10 ms and the frame length may be configurable and change over time. In some embodiments, each frame includes one or multiple downlink synchronization channels and/or one or multiple downlink broadcast channels and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set to 5 ms for autonomous vehicle applications. As another example, smart meters on houses may not require fast initial access, in which case the frame length may be set as 20 ms for smart meter applications.

A subframe might or might not be defined in the flexible frame structure, depending upon the implementation. For example, a frame may be defined to include slots, but no subframes. In frames in which a subframe is defined, e.g., for time domain alignment, the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

A slot might or might not be defined in the flexible frame structure, depending upon the implementation. In frames in which a slot is defined, then the definition of a slot (e.g., in time duration and/or in number of symbol blocks) may be configurable. In one embodiment, the slot configuration is common to all UEs 110 or a group of UEs 110. For this case, the slot configuration information may be transmitted to the UEs 110 in a broadcast channel or common control channel (s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration may be transmitted independently from the frame configuration signaling and/or subframe configuration signaling. In general, the slot configuration may be system common, base station common, UE group common or UE specific.

The SCS may range from 15 KHz to 480 KHz. The SCS may vary with the frequency of the spectrum and/or maximum UE speed to minimize the impact of Doppler shift and phase noise. In some examples, there may be separate transmission and reception frames and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g., if more flexible symbol durations are implemented using inverse discrete Fourier transform (IDFT) instead of fast Fourier transform (FFT). Additional examples of frame structures can be used with different SCSs.

The basic transmission unit may be a symbol block (alternatively called a symbol), which, in general, includes a redundancy portion (referred to as the CP) and an information (e.g., data) portion. In some embodiments, the CP may be omitted from the symbol block. The CP length may be flexible and configurable. The CP length may be fixed within a frame or flexible within a frame and the CP length may possibly change from one frame to another, or from one group of frames to another group of frames, or from one subframe to another subframe, or from one slot to another slot, or dynamically from one scheduling to another scheduling. The information (e.g., data) portion may be flexible and configurable. Another possible parameter relating to a symbol block that may be defined is ratio of CP duration to information (e.g., data) duration. In some embodiments, the symbol block length may be adjusted according to: a channel condition (e.g., multi-path delay, Doppler); and/or a latency requirement; and/or an available time duration. As another example, a symbol block length may be adjusted to fit an available time duration in the frame.

A frame may include both a downlink portion, for downlink transmissions from a base station 170, and an uplink portion, for uplink transmissions from the UEs 110. A gap may be present between each uplink and downlink portion, which gap is referred to as a switching gap. The switching gap length (duration) may be configurable. A switching gap duration may be fixed within a frame or flexible within a frame and a switching gap duration may possibly change from one frame to another, or from one group of frames to another group of frames, or from one subframe to another subframe, or from one slot to another slot, or dynamically from one scheduling to another scheduling.

A device, such as a base station 170, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center frequency, the lowest frequency or the highest frequency of the carrier. A carrier may be on a licensed spectrum or an unlicensed spectrum. Wireless communication with the device may also, or instead, occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and, optionally, one or multiple uplink resources. A cell may include one or multiple uplink resources and, optionally, one or multiple downlink resources. A cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may, instead or additionally, include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP or a carrier may have a bandwidth of 80 MHz and consist of two adjacent contiguous BWPs, etc. In other embodiments, a BWP may have one or more carriers, e.g., a BWP may have a bandwidth of 40 MHz and consist of two adjacent contiguous carriers, where each carrier has a bandwidth of 20 MHz. In some embodiments, a BWP may comprise non-contiguous spectrum resources, which consists of multiple non-contiguous multiple carriers, where the first carrier of the non-contiguous multiple carriers may be in the mmW band, the second carrier may be in a low band (such as the 2 GHz band), the third carrier (if it exists) may be in THz band and the fourth carrier (if it exists) may be in visible light band. Resources in one carrier which belong to the BWP may be contiguous or non-contiguous. In some embodiments, a BWP has non-contiguous spectrum resources on one carrier.

The carrier, the BWP or the occupied bandwidth may be signaled by a network device (e.g., by a base station 170) dynamically, e.g., in physical layer control signaling such as the known downlink control channel (DCI), or semi-statically, e.g., in radio resource control (RRC) signaling or in signaling in the medium access control (MAC) layer, or be predefined based on the application scenario; or be determined by the UE 110 as a function of other parameters that are known by the UE 110, or may be fixed, e.g., by a standard.

Going to the future wireless network, the number of the new devices could be increased exponentially with diverse functionalities. Also, a lot more new applications and use cases than those associated with 5G may emerge with more diverse quality of service demands. These use cases will result in new key performance indications (KPIs) for the future wireless networks (for an example, 6G network) that can be extremely challenging. It follows that sensing technologies and artificial intelligence (AI) technologies, especially machine learning and deep learning technologies, are being introduced to telecommunication for improving the system performance and efficiency.

AI technologies may be applied to communication systems. In particular AI technologies may be applied to communication in Physical layer and to communication in media access control (MAC) layer.

For the physical layer, the AI/ML technologies may be employed to optimize component design and improve algorithm performance. For example, AI technologies may be applied to channel coding, channel modelling, channel estimation, channel decoding, modulation, demodulation, MIMO, waveform, multiple access, PHY element parameter optimization and update, beam forming and tracking and sensing and positioning, etc.

For the MAC layer, AI technologies may be utilized in the context of learning, predicting and making decisions to solve complicated optimization problems with better strategy and optimal solution. For one example, AI technologies may be utilized to optimize the functionality in MAC for, e.g., intelligent TRP management, intelligent beam management, intelligent channel resource allocation, intelligent power control, intelligent spectrum utilization, intelligent modulation and coding scheme selection, intelligent HARQ strategy, intelligent transmit/receive mode adaption, etc.

AI architectures usually involve multiple nodes. The multiple nodes can be organized in two modes, i.e., a centralized mode and a distributed mode, both of which modes can be deployed in an access network, a core network or an edge computing system or third network. A centralized training and computing architecture is restricted by communication overhead and strict user data privacy. Distributed training and computing architecture may be organized according to several frameworks, e.g., distributed machine learning and federated learning. AI architectures include an intelligent controller, which can perform as a single agent or as a multi-agent, based on joint optimization or individual optimization. New protocols and signaling mechanisms may be established so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, tracking, autonomous delivery and mobility. Terrestrial network-based sensing and non-terrestrial network-based sensing could provide intelligent context-aware networks to enhance the UE experience. For an example, terrestrial network-based sensing and non-terrestrial network-based sensing may be shown to provide opportunities for localization applications and sensing applications based on new sets of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial networks and in non-terrestrial networks, the measured channel data and sensing and positioning data can be obtained by large bandwidth, new spectrum, dense network and more light-of-sight (LOS) links. Based on these data, a radio environmental map can be drawn through AI methods, where channel information is linked, in the map, to its corresponding positioning, or environmental information, to, thereby, provide an enhanced physical layer design based on this map.

Sensing coordinators are nodes in a network that can assist in the sensing operation. These nodes can be standalone nodes dedicated to just sensing operations or other nodes (for example, the T-TRP 170, the ED 110, or a node in the core network 130) doing the sensing operations in parallel with communication transmissions. New protocol and signaling mechanism is needed so that the corresponding interface link can be performed with customized parameters to meet particular requirements while minimizing signaling overhead and maximizing the whole system spectrum efficiency.

AI and sensing methods are data hungry. In order to involve AI and sensing in wireless communications, more and more data are needed to be collected, stored and exchanged. The characteristics of wireless data are known to expand to large ranges in multiple dimensions, e.g., from sub-6 GHz, millimeter to Terahertz carrier frequency, from space, outdoor to indoor scenario, and from text, voice to video. These data are collecting, processing and usage are performed in a unified framework or a different framework.

A terrestrial communication system may also be referred to as a land-based or ground-based communication system, although a terrestrial communication system can also, or instead, be implemented on or in water. The non-terrestrial communication system may bridge coverage gaps in underserved areas by extending the coverage of cellular networks through the use of non-terrestrial nodes, which will be key to establishing global, seamless coverage and providing mobile broadband services to unserved/underserved regions. In the current case, it is hardly possible to implement terrestrial access-points/base-stations infrastructure in areas like oceans, mountains, forests, or other remote areas.

The terrestrial communication system may be a wireless communications system using 5G technology and/or later generation wireless technology (e.g., 6G or later). In some examples, the terrestrial communication system may also accommodate some legacy wireless technologies (e.g., 3G or 4G wireless technology). The non-terrestrial communication system may be a communications system using satellite constellations, like conventional Geo-Stationary Orbit (GEO) satellites, which utilize broadcast public/popular contents to a local server. The non-terrestrial communication system may be a communications system using low earth orbit (LEO) satellites, which are known to establish a better balance between large coverage area and propagation path-loss/delay. The non-terrestrial communication system may be a communications system using stabilized satellites in very low earth orbits (VLEO) technologies, thereby substantially reducing the costs for launching satellites to lower orbits. The non-terrestrial communication system may be a communications system using high altitude platforms (HAPs), which are known to provide a low path-loss air interface for the users with limited power budget. The non-terrestrial communication system may be a communications system using Unmanned Aerial Vehicles (UAVs) (or unmanned aerial system, "UAS") achieving a dense deployment, since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs may be coupled to integrate satellite communications to cellular networks. Emerging 3D vertical networks consist of many moving (other than geostationary satellites) and high-altitude access points such as UAVs, HAPs and VLEOs.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and users and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or a Rx beam independently.

A beam may be formed by performing amplitude and/or phase weighting on data transmitted or received by at least one antenna port. A beam may be formed by using another method, for example, adjusting a related parameter of an antenna unit. The beam may include a Tx beam and/or a Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or an SSB resource identifier, or a sounding reference signal (SRS) resource identifier, or other reference signal resource identifier.

As one of key technologies of NR, MIMO can further improve a system capacity by using more spatial degrees of freedom.

Beam management is one of the elements of successful use of MIMO. In typical beam management schemes, a weight of an antenna (port), in a multi-antenna system, may be adjusted so that energy in the transmitted signals is directional. That is, the energy is aggregating in a certain direction. Such an aggregation of energy is typically called a beam. For NR, the entire air interface is designed based on beams; uplink channels are transmitted on beams; and downlink channels are received on beams. Beam management relates to establishing and retaining a suitable beam pair. A beam pair includes a transmitter-side beam with a transmitter-side beam direction and a corresponding receiver-side beam with a receiver-side beam direction. When implemented appropriately, a beam pair jointly provides good connectivity. Aspects of beam management include initial beam establishment, beam adjustment and beam recovery. Further aspects of beam management include beam selection, beam measurement, beam reporting, beam switching, beam indication, etc.

Current NR beam management belongs to a passive beam management. Beam management, including beam alignment and/or beam switching and/or beam adjustment and/or beam indication and/or beam recovery, fully rely on measurement and/or training of individual pilot signals and beams. For example, the known quasi-colocation-based (QCL-based) format of beam indication may be shown to rely upon beam pre-training and measurement. In known schemes for beam switching, the determination of a new beam pair depends upon beam measurement and transmitter-side beam training and/or receiver-side beam training. In known beam failure recovery procedures, both beam failure detection and new beam identification are implemented through the use of beam measurement. A beam failure detection reference signal set and new beam identification reference signal set are configured to facilitate the known beam failure recovery procedures. It can be shown that excessive beam measurement results in a large latency and overheads.

It is understood that modern developments in the area of sensing technology will give devices in a 6G network environmental awareness. In this way, information such as the location of a given UE 110, in addition to the angle of arrival (AOA) and the angle of departure (AOD) of a connection to the given UE 110, can be easily obtained through the use of sensing signals to obtain sensing information. With the sensing information and the help of AI technologies, the TRP 170 and the UE 110 may be configured to implement a proactive, UE-centric beam management scheme. That is, the UE 110 and the TRP 170 may proactively obtain predictions for new transmit/receive beam directions. Such predictions may be shown to reduce the application of pilot and beam training in beam management. Such an ability to predict may be expected to help reduce the overhead associated with pilot and beam training and, thereby, achieve low-latency beam management. Aspects of the present application propose methods for pilot and beam training that include the help of the sensing signal.

The current NR communication system is not configured to make use of a sensing signal. Aspects of the present application address the task of configuring the sensing signal. Specially, aspects of the present application relate to configuring the beam direction of the sensing signal, including DL sensing signals and UL sensing signals.

Beam indication is an important component of beam management. In current methods, a beam pair may be indicated by a QCL-based beam indication method. QCL-based beam indication methods generally indicate a relationship between the target beam and a source reference beam. These two beams are considered to be QCL, which means that the features of the target beam can be deduced from the features of the source reference beam. After an RRC connection has been established, a Transmission Configuration Indicator (TCI) state may be used to associate a corresponding QCL type of one or two DL reference signals (e.g., SSB, CSI-RS, etc.). The known QCL-based beam indication method has several points of disadvantage. The first point is that the known QCL-based beam indication method can only indicate that the target RS and the source RS have a relationship with the same feature but cannot indicate other relationships. The second point is that the known QCL-based beam indication method requires source reference beams. Notably, the source reference beams need to be pre-trained and measured, resulting in a relatively large latency and relatively large overhead. With the increasing number of UEs 110 in future wireless communication networks, the overheads of beam training may be expected to increase sharply due to an increase in a quantity of training or measurement beams. The third point is that the known QCL-based beam indication method cannot directly indicate a physical direction relationship between beams.

In overview, aspects of the present application relate to configuring the beam direction of sensing signals, including uplink sensing signals and downlink sensing signals. Aspects of the present application relate to network-initiated sensing and UE-initiated sensing. Indication of beam direction may be performed using coordinate-based beam indication method. This coordinate-based beam direction indication method directly indicates beam direction based on a predetermined coordinate system.

Depending on whether the receive side and the transmit side of a given sensing signal are located in the TRP 170 or the UE 110, future multi-static sensing modes may be divided among six categories. A mode wherein the receive side and the transmit side of the sensing signal are located at the same place may be called a monostatic sensing mode. A mode wherein the receive side and the transmit side of the sensing signal are separated may be called a bistatic sensing mode.

Figure 5:
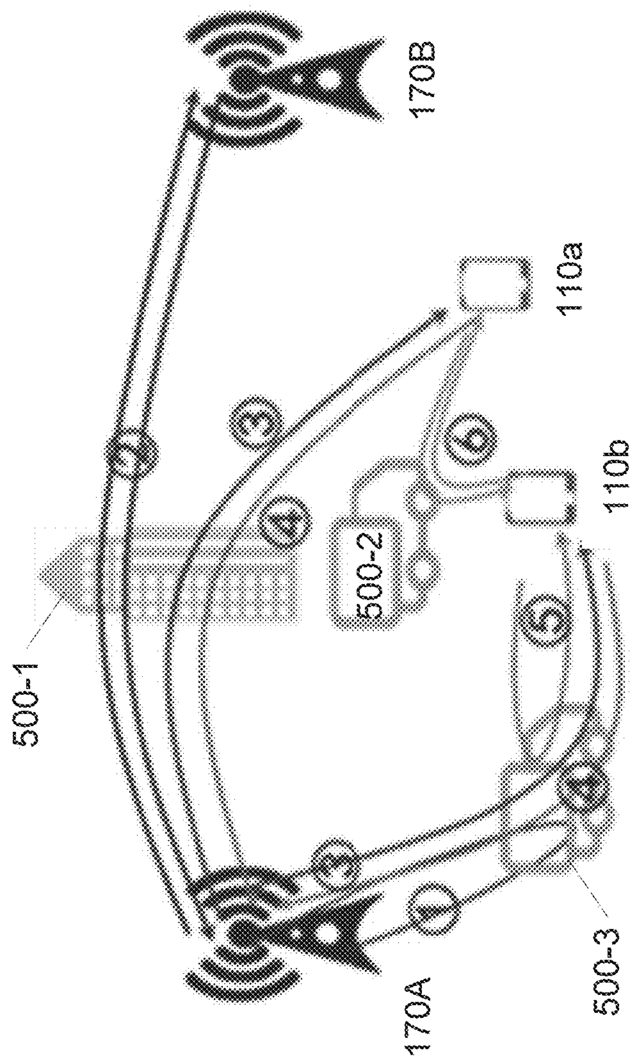
FIG. 5 illustrates, in a schematic diagram, six multi-static sensing scenarios.

FIG. 5 illustrates, in a schematic diagram, six multi-static sensing scenarios. The scenarios of FIG. 5 may involve a first TRP 170A, a second TRP 1706, a first UE 110*a* and a second UE 110*b*. In each scenario, the devices seek to sense their environment and, more particularly, elements 500-1, 500-2, 500-3 of the environment.

Figure 6:
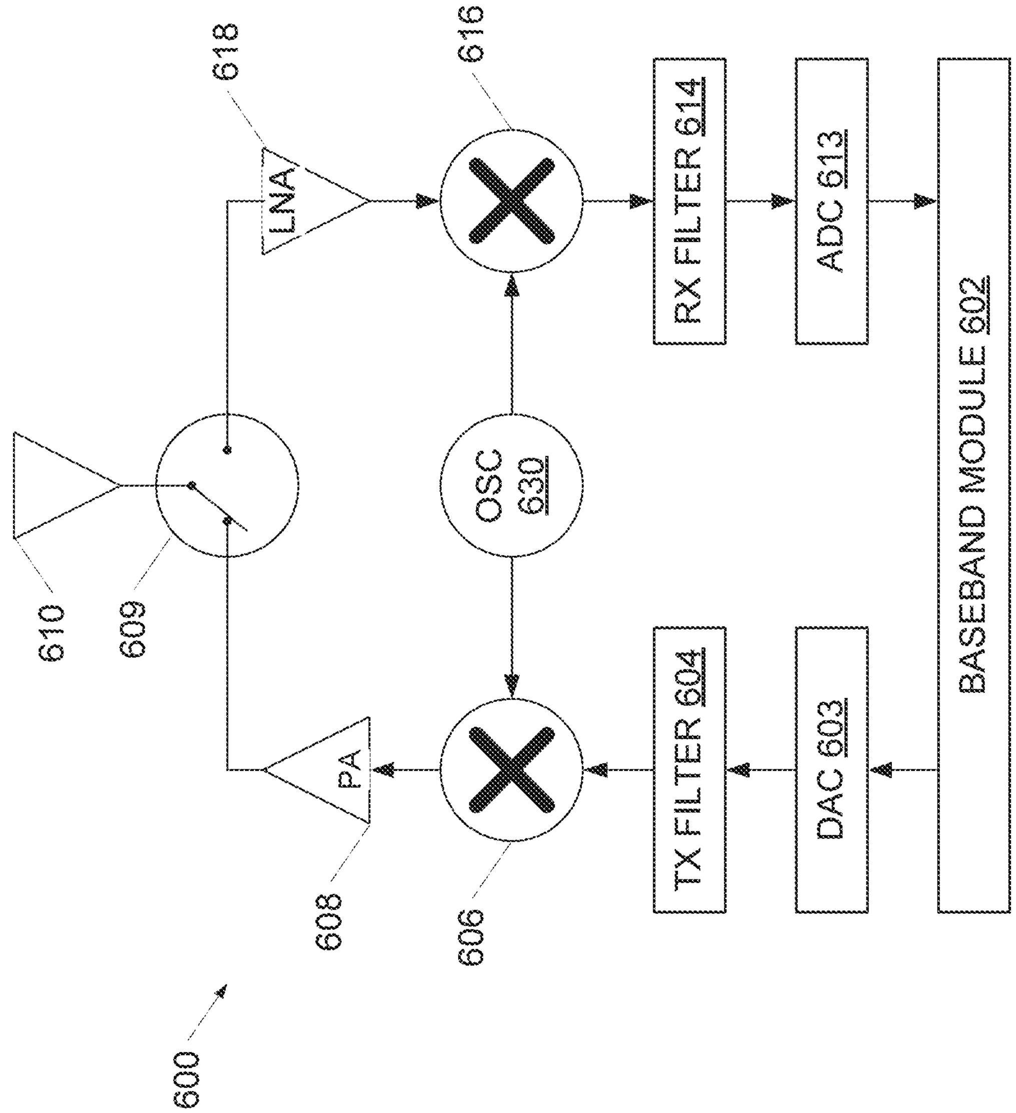
FIG. 6 illustrates a first architecture for a transceiver.

FIG. 6 illustrates a first architecture 600 for a transceiver. The first architecture 600 is well suited to time division duplexing (TDD) transmission and reception of communication signals. In operation, a baseband module 602 provides a digital signal to a digital-to-audio converter (DAC) 603. Output from the DAC 603 is provided to a transmission filter 604. Filtered output from the transmission filter 604 is multiplied, at a transmission multiplier 606, by a carrier received from an oscillator 630 and the product is provided to a power amplifier (PA) 608 for amplification before transmission of a communication signal at an antenna 610. Notably, the transmission is allowed to occur when a switch 609 is in a first position.

When the switch 609 is in a second position, the first architecture 600 may be used for receiving communication signals. Communication signals received at the antenna 610 are detected at a low noise amplifier (LNA) 618. Output from the LNA 618 is demodulated at a reception multiplier 616 with the assistance of the carrier received from the oscillator 630. Output from the reception multiplier 616 is filtered at a reception filter 614 and converted to a digital signal by an analog-to-digital converter (ADC) 613 before being provided to the baseband module 602.

The first architecture 600 of FIG. 6 is a transceiver structure used in known (NR) systems. The first architecture 600 of FIG. 6 only supports a bistatic sensing mode. The first architecture 600 of FIG. 6 can be supported by existing hardware.

Figure 7:
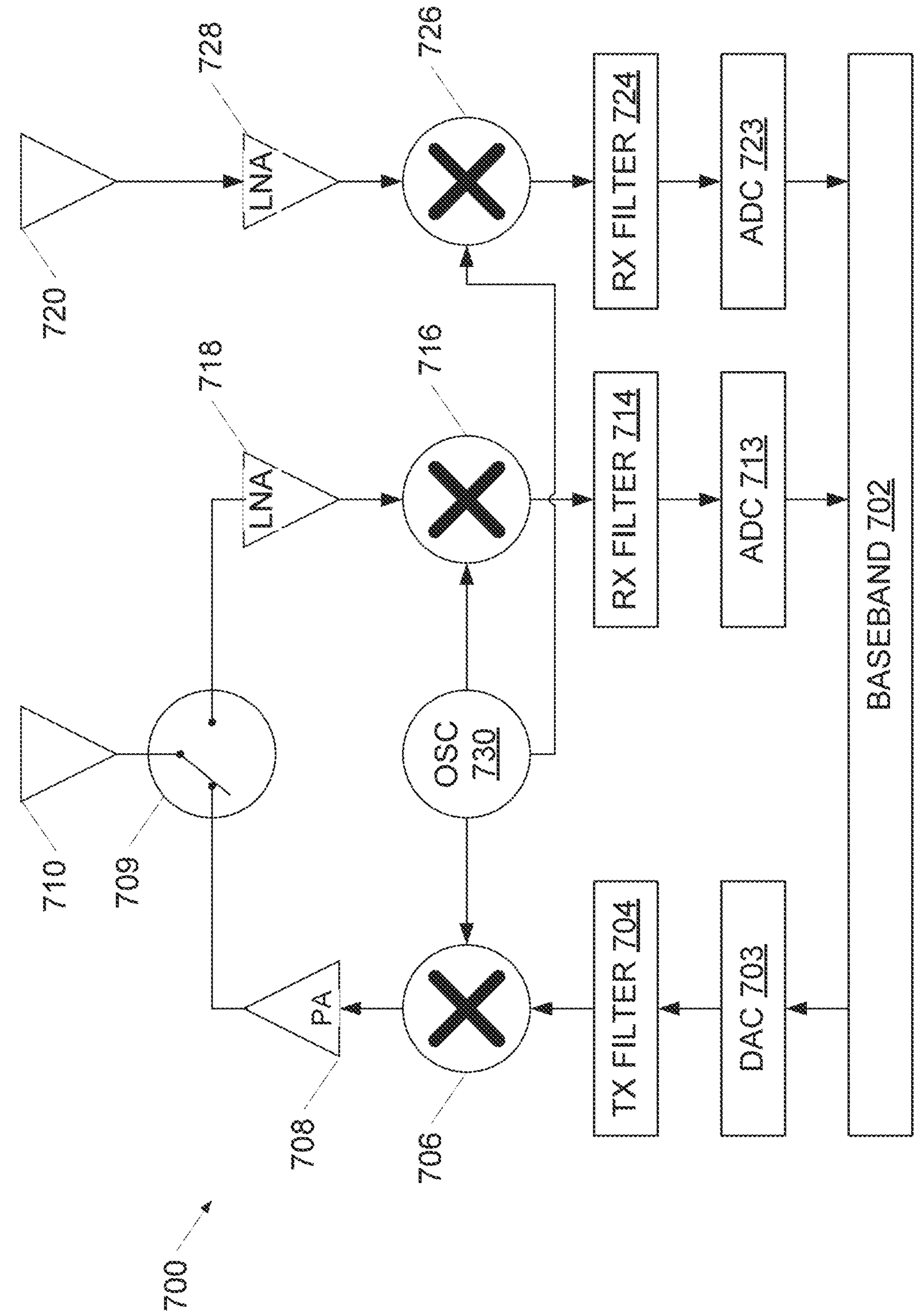
FIG. 7 illustrates a second architecture for a transceiver.

FIG. 7 illustrates a second architecture 700 for a transceiver. The second architecture 700 is well suited to time division duplexing (TDD) transmission and reception of communication signals and reception of sensing signals. In operation, a baseband module 702 provides a digital signal to a DAC 703. Output from the DAC 703 is provided to a transmission filter 704. Filtered output from the transmission filter 704 is multiplied, at a transmission multiplier 706, by a carrier received from an oscillator 730 and the product is provided to a PA 708 for amplification before transmission of a communication signal at an antenna 710. Notably, the transmission is allowed to occur when a switch 709 is in a first position.

When the switch 709 is in a second position, the second architecture 700 may be used for receiving communication signals. Communication signals received at the antenna 710 are detected at a reception LNA 718. Output from the reception LNA 718 is demodulated at a reception multiplier 716 with the assistance of the carrier received from the oscillator 730. Output from the reception multiplier 716 is filtered at a reception filter 714 and converted to a digital signal by an ADC 713 before being provided to the baseband module 702.

Additionally, sensing signals received at a further antenna 720 are detected at a sensing LNA 728. Output from the sensing LNA 728 is demodulated at a sensing multiplier 726 with the assistance of the carrier received from the oscillator 730. Output from the sensing multiplier 726 is filtered at a sensing filter 724 and converted to a digital signal by a sensing ADC 723 before being provided to the baseband module 702.

The second architecture 700 of FIG. 7 is a possible transceiver structure for future networks. The second architecture 700 of FIG. 7 may be configured to support both the monostatic sensing mode and the bistatic sensing mode. However, the second architecture 700 of FIG. 7 has high requirements on hardware.

Figure 8:
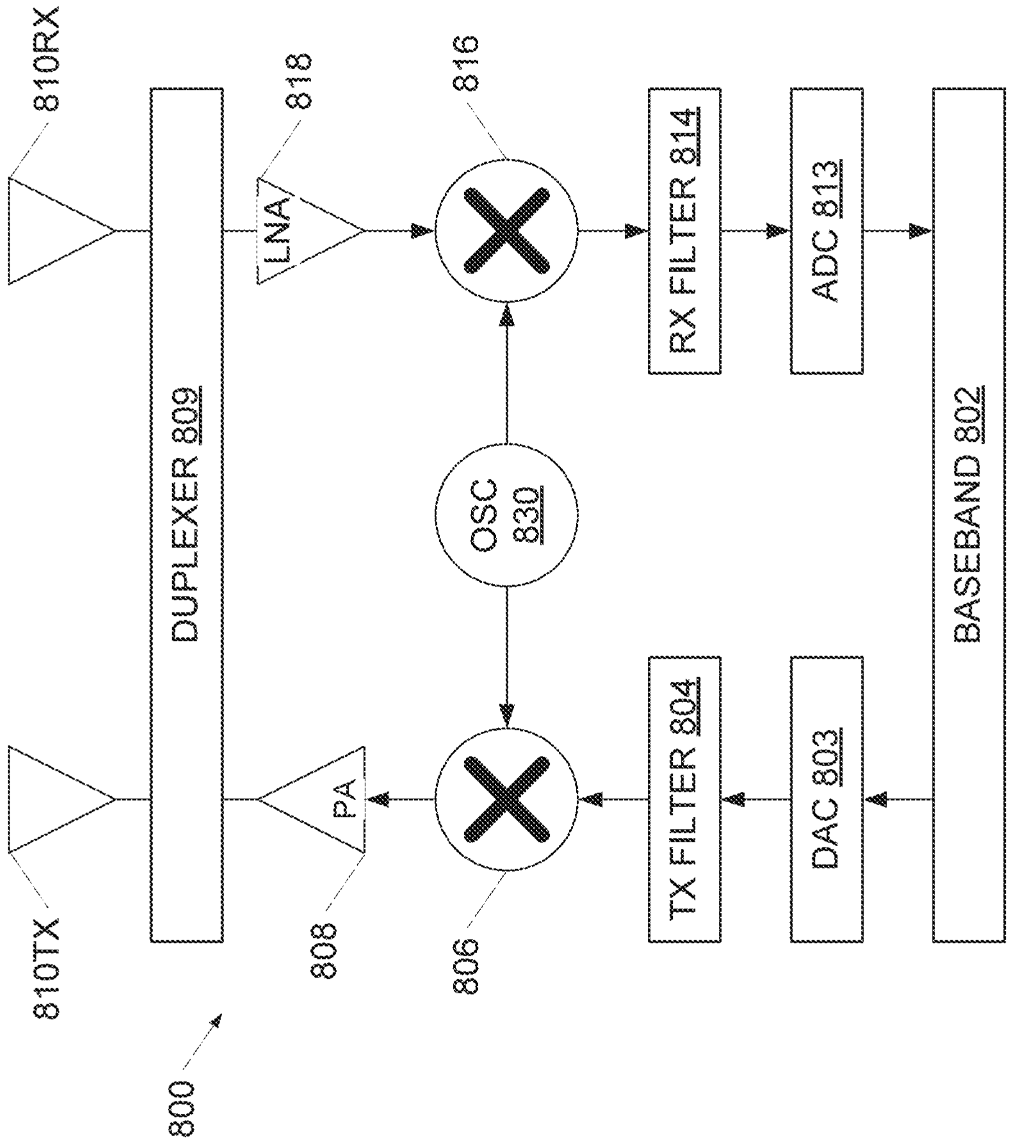
FIG. 8 illustrates a third architecture for a transceiver.

FIG. 8 illustrates a third architecture 800 for a transceiver. The third architecture 800 is well suited to full duplex (FD) transmission and reception of communication signals and sensing signals. In operation, a baseband module 802 provides a digital signal to a DAC 803. Output from the DAC 803 is provided to a transmission filter 804. Filtered output from the transmission filter 804 is multiplied, at a transmission multiplier 806, by a carrier received from an oscillator 830 and the product is provided to a PA 808 for amplification before transmission of a communication signal at a transmit antenna 810TX. Notably, the transmission is allowed to occur according to the operation of a duplexer 809.

When allowed to occur according to the operation of the duplexer 809, the third architecture 800 may be used for receiving communication and sensing signals. Signals received at a receive antenna 810RX are detected at an LNA 818. Output from the LNA 818 is demodulated at a reception multiplier 816 with the assistance of the carrier received from the oscillator 830. Output from the reception multiplier 816 is filtered at a reception filter 814 and converted to a digital signal by an analog-to-digital converter (ADC) 813 before being provided to the baseband module 802.

The third architecture 800 of FIG. 8 is a possible receiver structure for use in future networks. The third architecture 800 of FIG. 8 may support both the monostatic sensing mode and the bistatic sensing mode. The third architecture 800 of FIG. 8 may also support full duplex but at the cost of a high requirement on hardware.

Figure 9:
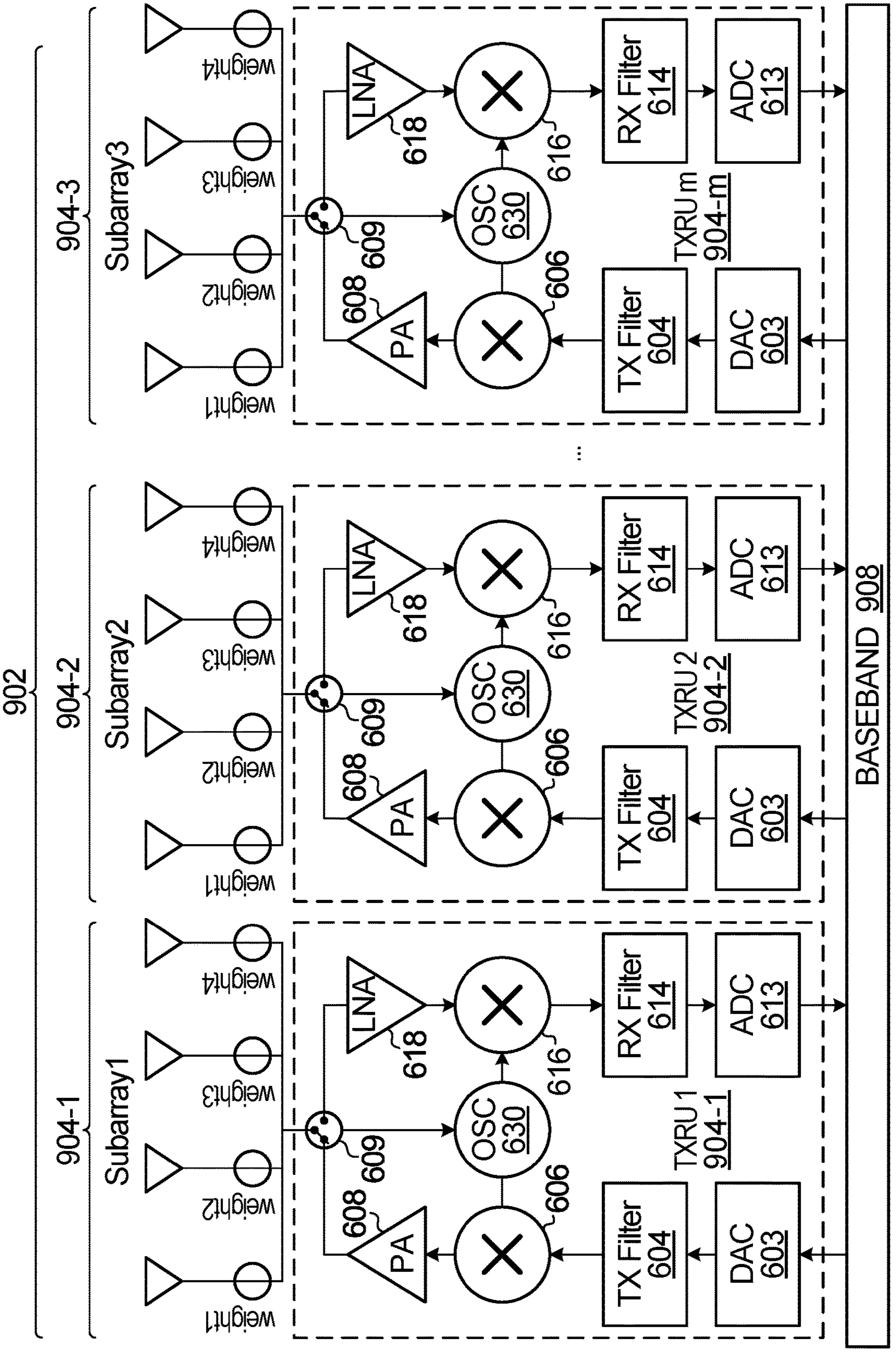
FIG. 9 illustrates a sub-array partition model wherein the first transceiver architecture of FIG. 6 is applied to a multi-antenna case.
Figure 10:
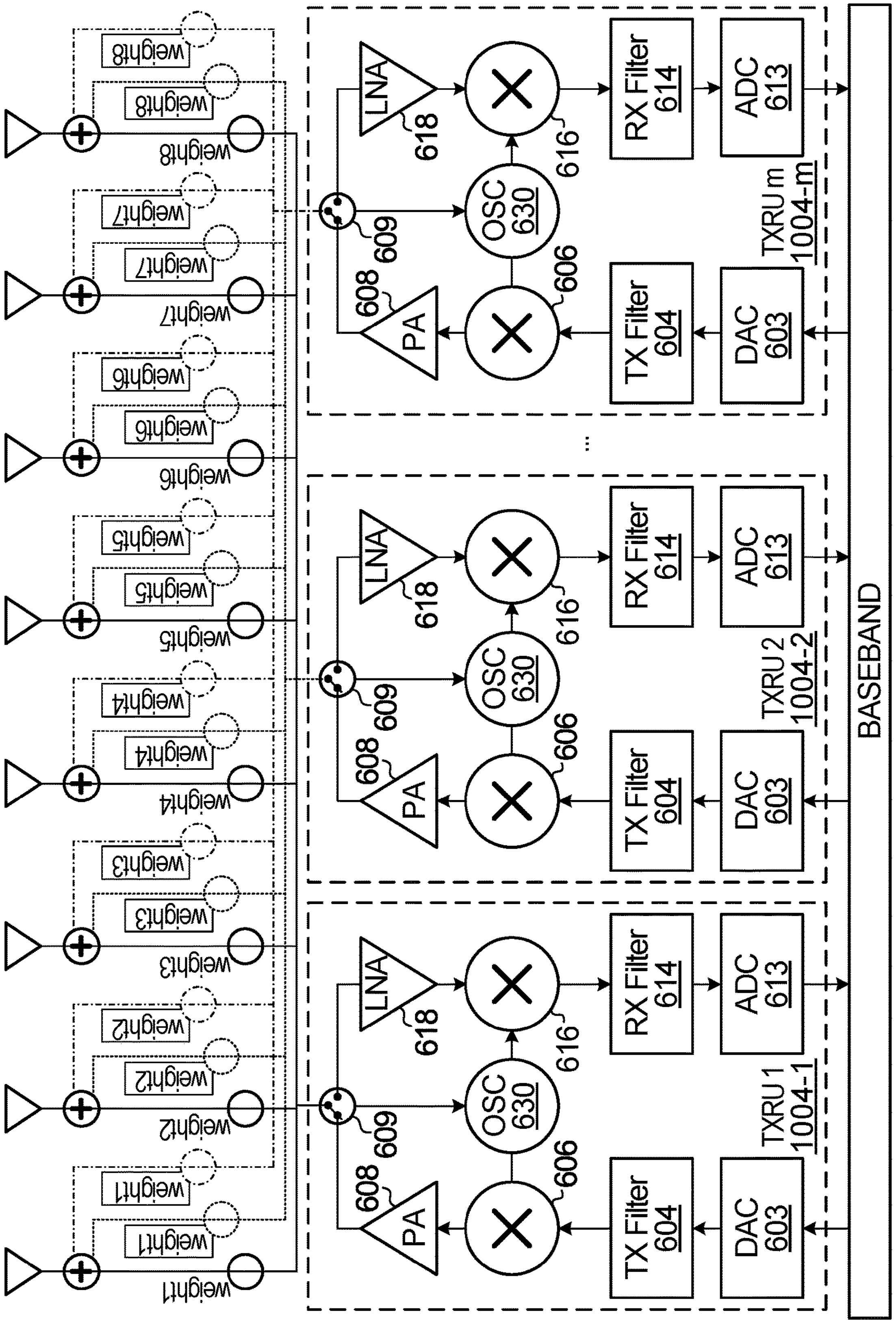
FIG. 10 illustrates a full-connection model wherein the first transceiver architecture of FIG. 6 is applied to a multi-antenna case.
Figure 11:
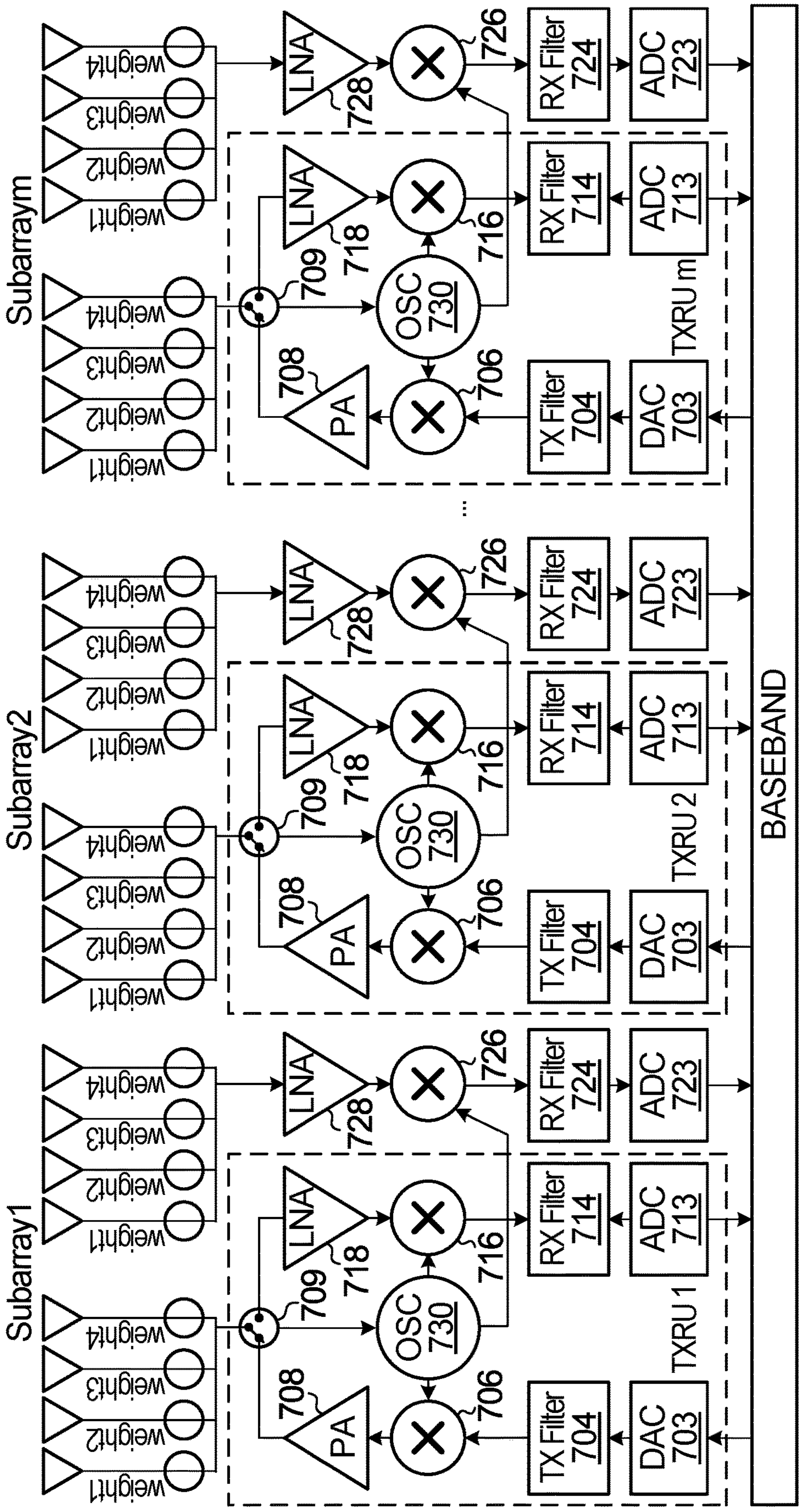
FIG. 11 illustrates a sub-array partition model wherein the first transceiver architecture of FIG. 7 is applied to a multi-antenna case.
Figure 12:
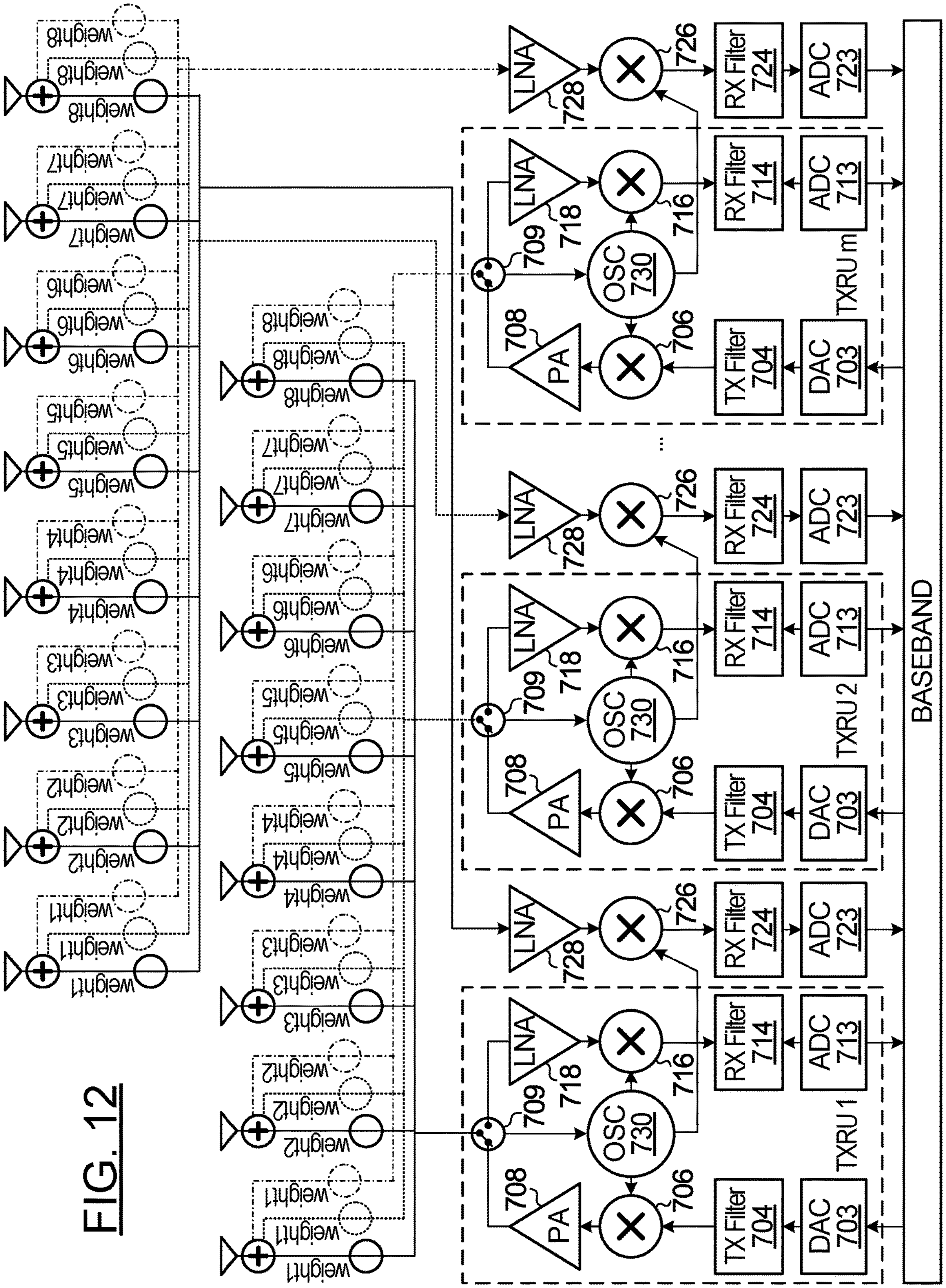
FIG. 12 illustrates a full-connection model wherein the first transceiver architecture of FIG. 7 is applied to a multi-antenna case.
Figure 13:
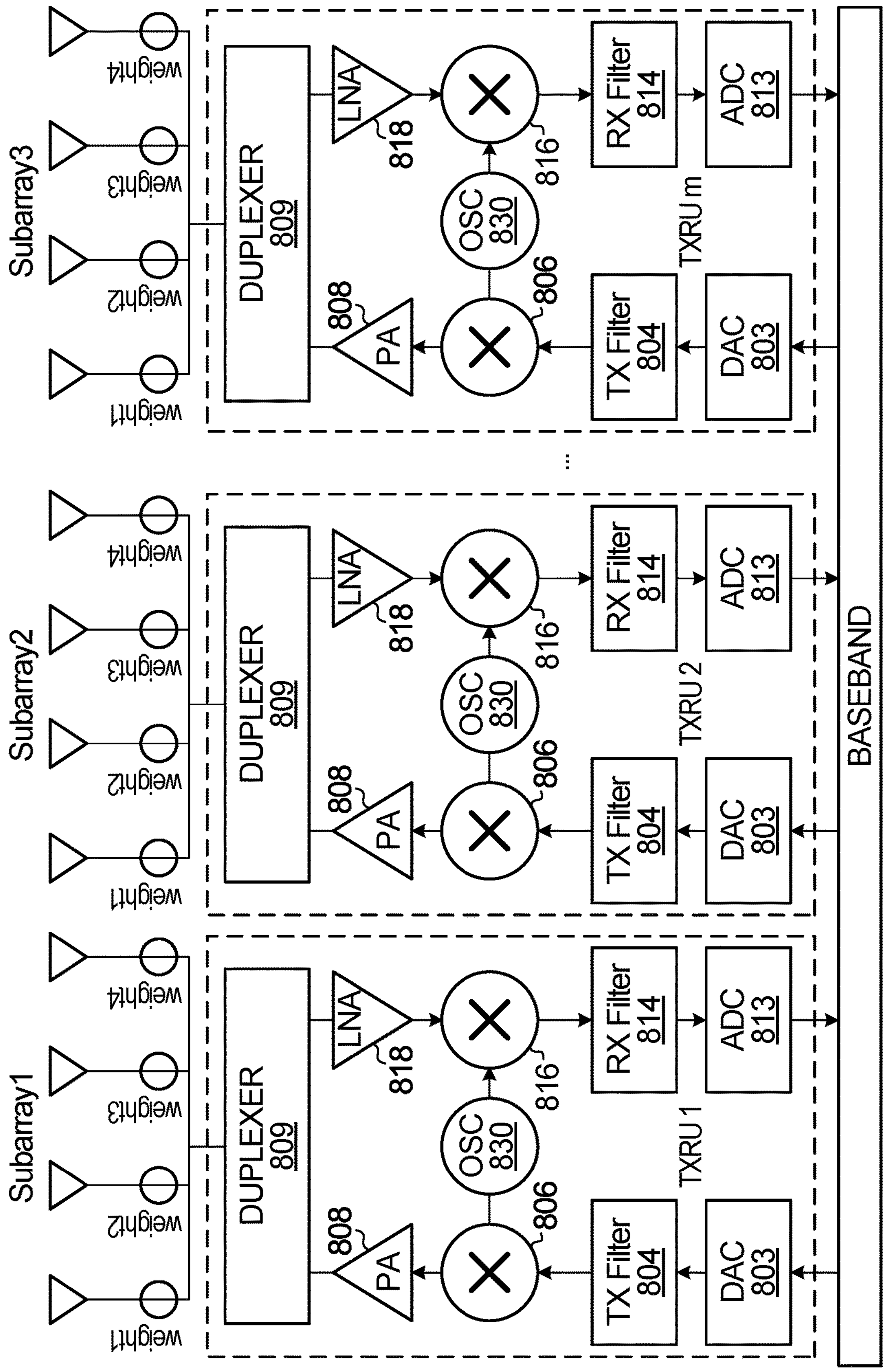
FIG. 13 illustrates a sub-array partition model wherein the first transceiver architecture of FIG. 8 is applied to a multi-antenna case.
Figure 14:
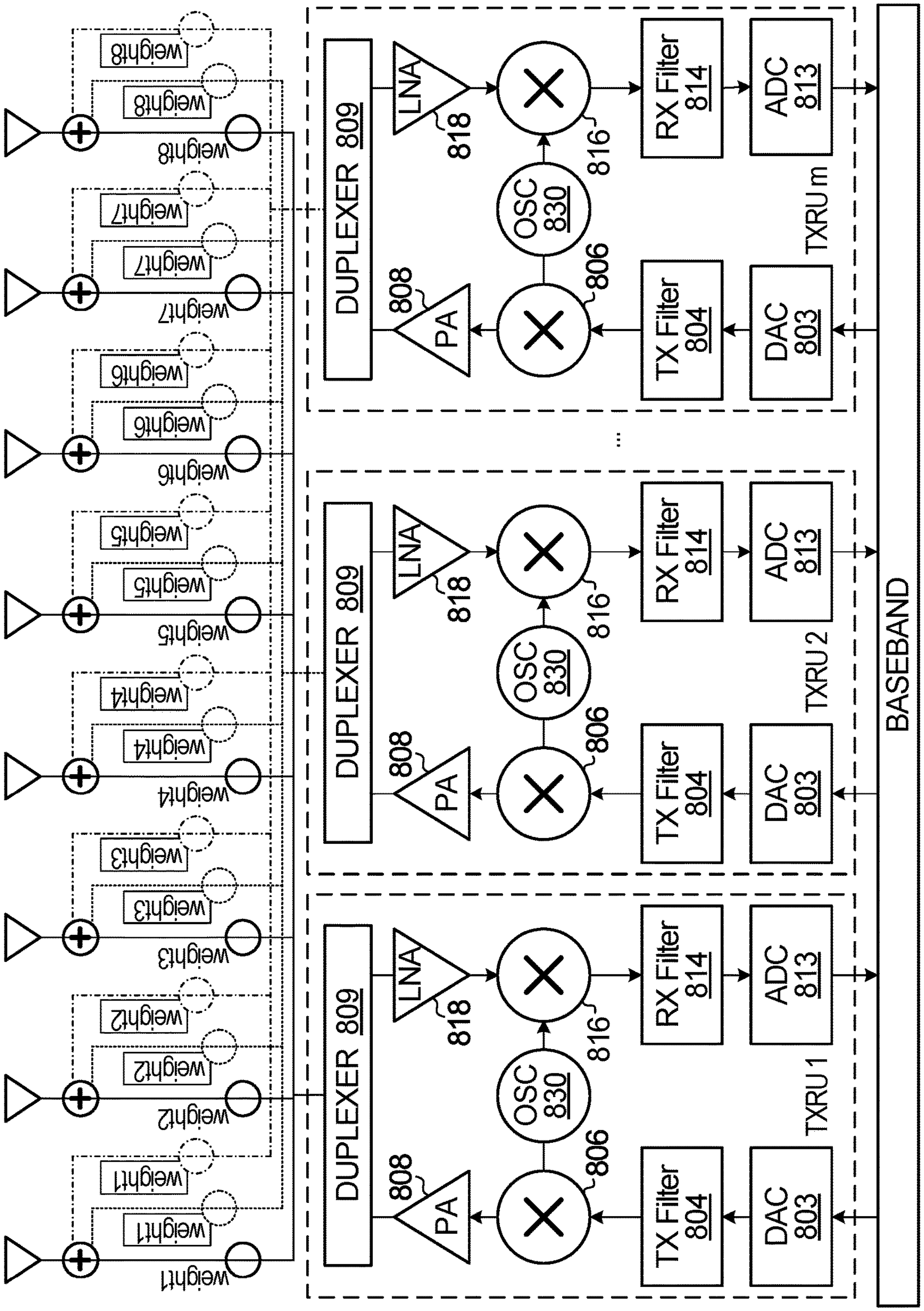
FIG. 14 illustrates a full-connection model wherein the first transceiver architecture of FIG. 8 is applied to a multi-antenna case.

The architecture of transceivers shown in FIG. 6, FIG. 7 and FIG. 8 are all based on a single antenna and single TXRU. FIG. 9 and FIG. 10 illustrate the corresponding two MIMO architecture of transceivers of FIG. 6 based on multiple antennas and multiple TXRUs. In particular, FIG. 9 illustrates a sub-array partition model and FIG. 10 shows a full-connection model. FIG. 11 and FIG. 12 illustrate the corresponding two MIMO architecture of transceivers of FIG. 7 based on multiple antennas and multiple TXRUs. In particular, FIG. 11 illustrates a sub-array partition model and FIG. 12 illustrates full-connection model. FIG. 13 and FIG. 14 illustrate the corresponding two MIMO architecture of transceivers of FIG. 8 based on multiple antennas and multiple TXRUs. In particular, FIG. 13 illustrates a sub-array partition model and FIG. 14 illustrates a full-connection model.

FIG. 9 shows one of the corresponding MIMO architecture of transceivers of FIG. 6 based on multiple antennas and multiple TXRUs. FIG. 9 shows sub-array partition model. In the architecture of FIG. 9, an antenna array 902 is divided into multiple subarrays 904-1, 904-2, . . . , 904-*m* (collectively or individually, 904). The signal of each subarray 904 is weighted to implement analog beamforming. The signal of each subarray 904 is independently processed by a TXRU among a corresponding multiple of TXRUs 906-1, 906-2, . . . , 906-*m* (collectively or individually, 906). The signals from all TXRUs 906 are uniformly processed by a baseband processor 908.

FIG. 10 shows one of the corresponding MIMO architecture of transceivers of FIG. 6 based on multiple antennas and multiple TXRUs 1006-1, 1006-2, . . . , 1006-*m* (collectively or individually, 1006). FIG. 10 shows full-connection model. Assuming that the system includes m TXRUs 1006, wherein m is an integer, m>0. Each TXRU 1006 corresponds to a group of weights of all antennas required for analog beamforming. The signal of the antenna array are separately weighted by using m groups of weights. The m weighted results are added to implement analog beamforming. The signal from all TXRUs 1006 are uniformly processed by a baseband processor.

FIG. 11 shows one of the corresponding MIMO architecture of transceivers of FIG. 7 based on multiple antennas and multiple TXRUs. FIG. 11 shows a sub-array partition model.

FIG. 12 shows one of the corresponding MIMO architecture of transceivers of FIG. 7 based on multiple antennas and multiple TXRUs. FIG. 12 shows a full-connection model.

FIG. 13 shows one of the corresponding MIMO architecture of transceivers of FIG. 8 based on multiple antennas and multiple TXRUs. FIG. 13 shows a sub-array partition model.

FIG. 14 shows one of the corresponding MIMO architecture of transceivers of FIG. 8 based on multiple antennas and multiple TXRUs. FIG. 14 shows a full-connection model.

Returning to FIG. 5, it may be assumed that the first TRP 170A and the second TRP 1706 have transceivers with relatively strong capabilities, such as transceivers with the second architecture 700 of FIG. 7 or the third architecture 800 of FIG. 8. The first UE 110*a* may be assumed to have a transceiver with a common capability, such as a transceiver with the first architecture 600 of FIG. 6. The second UE 110*b* may be assumed to have a receiver with a relatively strong capability, such as a transceiver with the second architecture 700 of FIG. 7.

FIG. 15 presents a table 1500 summarizing aspects of the six sensing scenarios presented in FIG. 5.

The first row of the table 1500 provides a circled numeral as a heading for each column, where the numeral in the circle is a reference to a sensing scenario in FIG. 5. The second row of the table 1500 identifies a device on the transmit side of the sensing signal for the scenario identified in the first row of the column. The third row of the table 1500 identifies a device on the receive side of the sensing signal for the scenario identified in the first row of the column. The fourth row of the table 1500 identifies a sensing mode for the scenario identified in the first row of the column. The sensing mode is identified as either the monostatic sensing mode or the bistatic sensing mode. The fifth row of the table 1500 identifies a communication link resources for sensing signal transmission for the scenario identified in the first row of the column.

Figure 16:
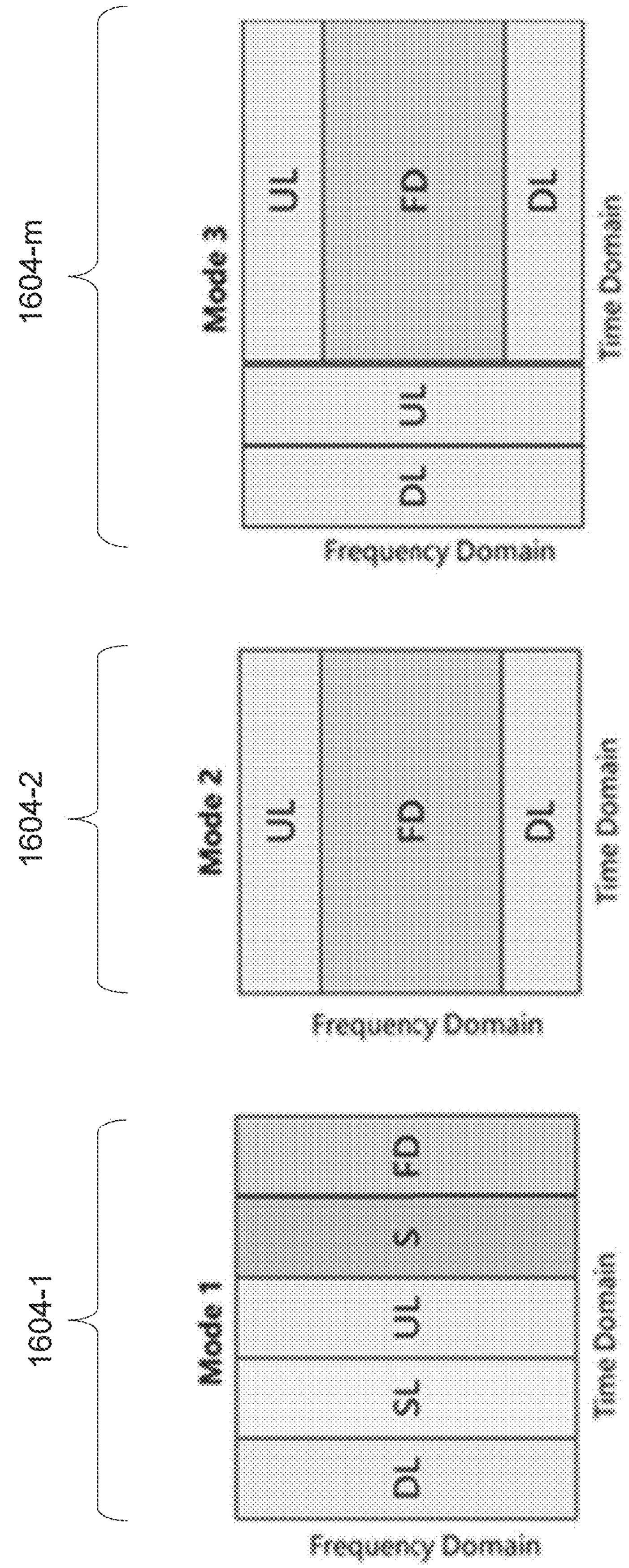
FIG. 16 illustrates resource distribution of a bandwidth part.

FIG. 16 illustrates a distribution of communication link resources. Time resources of the communication link may be classified into downlink (DL), uplink (UL), sidelink (SL), full duplex (FD) and special frame (S). The distribution may be shown as a mode 1 1600-1. Frequency resources of the communication link may be classified into downlink (DL), uplink (UL), sidelink (SL), full duplex (FD). The distribution may be shown as a mode 2 1600-2. In addition, the distribution may be shown as a mode 3 1600-3 in combination with the above two resource distributions.

The sixth row of the table 1500 identifies a sensing node, that is, the receiver side of sensing signal. The seventh row of the table 1500 provides comments on the impact of sensing signal transmission on the air interface.

A scenario wherein the first TRP 170A perform sensing using a monostatic sensing mode is labeled with a circled numeral 1. A scenario wherein the first TRP 170A (transmit side) and the second TRP 170B (receive side) perform sensing using a bistatic sensing mode is labeled with a circled numeral 2. A scenario wherein the first TRP 170A (downlink, transmit side) and the first UE 110*a* (downlink, receive side) perform sensing using a bistatic sensing mode is labeled with a circled numeral 3. A scenario wherein the first UE 110*a* (uplink, transmit side) and the first TRP 170A (uplink, receive side) perform sensing using a bistatic sensing mode is labeled with a circled numeral 4. A scenario wherein the second UE 110*b* performs sensing using a monostatic sensing mode is labeled with a circled numeral 5. A scenario wherein the first UE 110*a* (sidelink, transmit side) and the second UE 110*b* (sidelink, receive side) perform sensing using a bistatic sensing mode is labeled with a circled numeral 6.

Aspects of the present application apply to scenarios 3, 4, 5 and 6. Scenario 3 describes downlink-based sensing transmission. Scenario 4 describes uplink-based sensing transmission. In scenario 3, the TRP 170 configures the sensing signal to the UE 110 and the UE 110 behavior for reception. The TRP 170 transmits a sensing signal to the UE 110 as an illumination signal. In scenarios 4 and 5, the TRP 170 configures the sensing signal to the UE 110 and grants the UE 110 permission to transmit the sensing signal. The UE 110 transmits the sensing signal. In the foregoing three scenarios, beam indication for the sensing signal may be part of the configuration. Accordingly, the configuration of the beam direction of the sensing signal is worth studying.

Aspects of the present application relate to a method of configuring the beam direction of sensing signals, including uplink sensing signals and downlink sensing signals. Some aspects of the present application relate to a network-initiated sensing configuration scheme. Other aspects of the present application relate to a UE-initiated sensing configuration scheme. Further aspects of the present application relate to expressing indications of beam direction in a coordinate-based manner. Coordinate-based beam indication involves directly indicating beam directions based on a predefined coordinate system.

Figure 17:
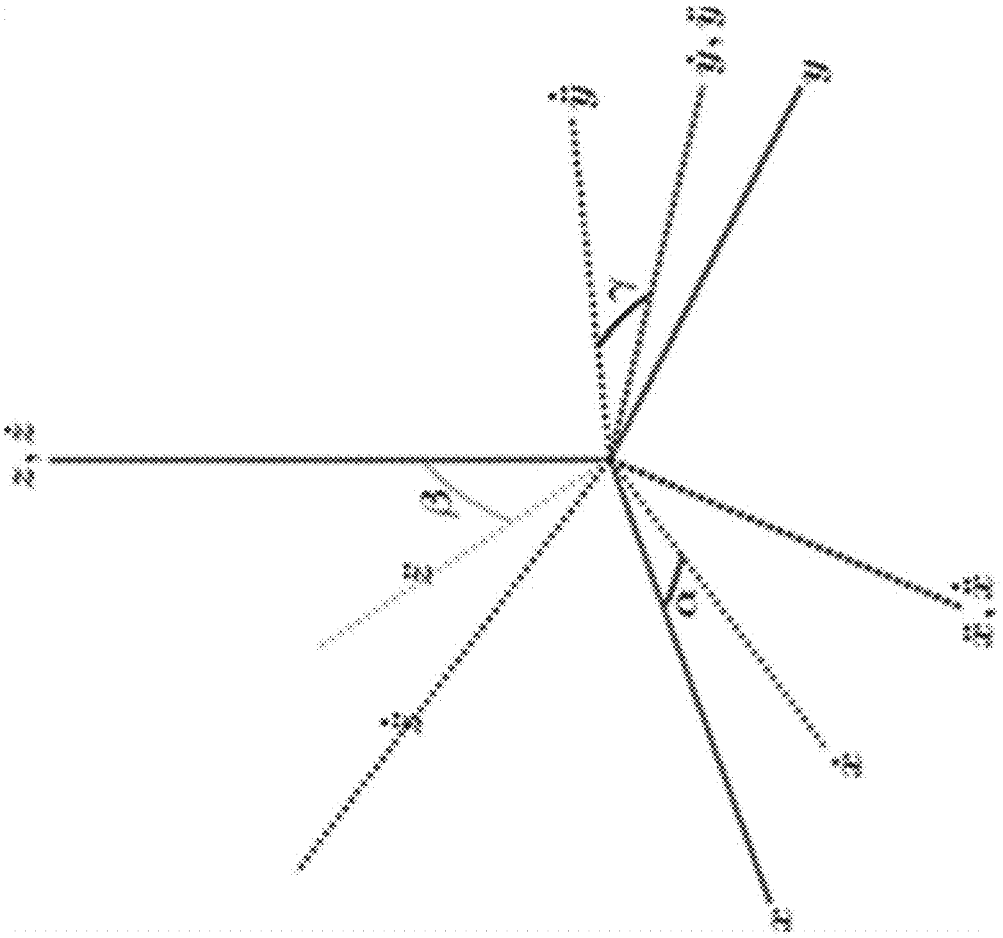
FIG. 17 illustrates a sequence of rotations that relate a global coordinate system to a local coordinate system.

Initially, a global coordinate system (GCS) and multiple local coordinate systems (LCS) may be defined. The GCS may be a global unified geographical coordinate system or a coordinate system comprising of only some TRPs 170 and UEs 110, defined by the RAN. From another perspective, GCS may be UE-specific or common to a group of UEs. An antenna array for a TRP 170 or a UE 110 can be defined in a Local Coordinate System (LCS). An LCS is used as a reference to define the vector far-field that is pattern and polarization, of each antenna element in an array. The placement of an antenna array within the GCS is defined by the translation between the GCS and an LCS. The orientation of the antenna array with respect to the GCS is defined in general by a sequence of rotations. The sequence of rotations may be represented by the set of angles α, β and γ. The set of angles {α, β, γ} can also be termed as the orientation of the antenna array with respect to the GCS. The angle α is called the bearing angle, β is called the downtilt angle and γ is called the slant angle. FIG. 17 illustrates the sequence of rotations that relate the GCS and the LCS. In FIG. 17, an arbitrary 3D-rotation of the LCS is contemplated with respect to the GCS given by the set of angles {α, β, γ}. The set of angles {α, β, γ} can also be termed as the orientation of the antenna array with respect to the GCS. Any arbitrary 3-D rotation can be specified by at most three elemental rotations and, following the framework of FIG. 17, a series of rotations about the z, $\dot{y}$ and $\ddot{x}$ axes are assumed here, in that order. The dotted and double-dotted marks indicate that the rotations are intrinsic, which means that they are the result of one (˙) or two (¨) intermediate rotations. In other words, the $\dot{y}$ axis is the original y axis after the first rotation about the z axis and the $\ddot{x}$ axis is the original x axis after a first rotation about the z axis and a second rotation about the $\dot{y}$ axis. A first rotation of α about the z axis sets the antenna bearing angle (i.e., the sector pointing direction for a TRP antenna element). The second rotation of β about the $\dot{y}$ axis sets the antenna downtilt angle.

Finally, the third rotation of γ about the $\ddot{x}$ axis sets the antenna slant angle. The orientation of the x, y and z axes after all three rotations can be denoted as $\dddot{x}$, $\dddot{y}$, and $\dddot{z}$. These triple-dotted axes represent the final orientation of the LCS and, for notational purposes, may be denoted as the x', y' and z' axes (local or "primed" coordinate system).

Figure 18:
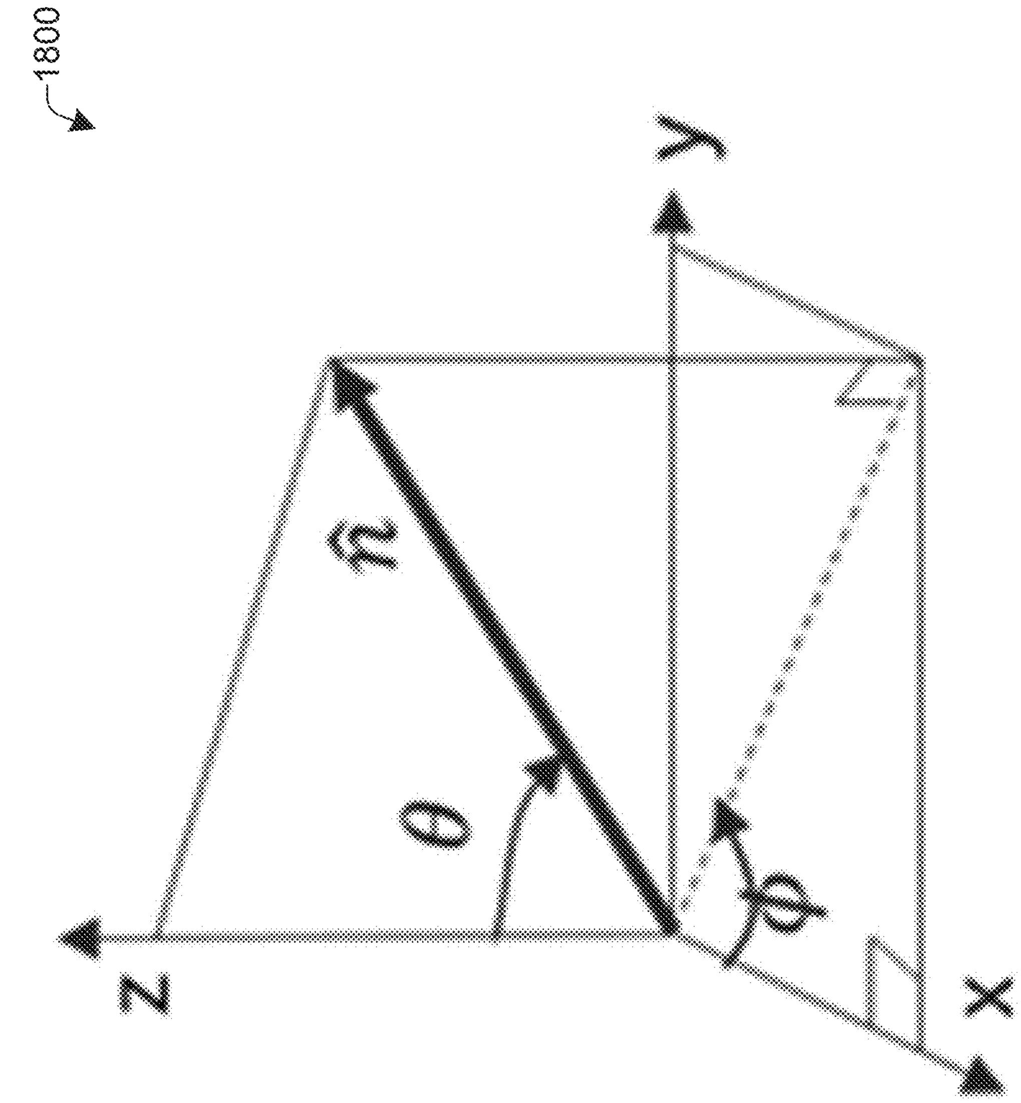
FIG. 18 illustrates spherical angles and spherical unit vectors.

A coordinate system is defined by the x, y and z axes, the spherical angles and the spherical unit vectors as illustrated in FIG. 18. A representation 1800 in FIG. 18 defines a zenith angle θ and the azimuth angle ϕ in a Cartesian coordinate system. $\hat{n}$ is the given direction and the zenith angle, θ, and the azimuth angle, ϕ, may be used as the relative physical angle of the given direction. Note that θ=0 points to the zenith and ϕ=0 points to the horizon.

A method of converting the spherical angles (θ,ϕ) of the GCS into the spherical angles (θ',ϕ') of the LCS according to the rotation operation defined by the angles α, β and γ is given below.

To establish the equations for transformation of the coordinate system between the GCS and the LCS, a composite rotation matrix is determined that describes the transformation of point (x,y,z), in the GCS, into point (x',y',z'), in the LCS. This rotation matrix is computed as the product of three elemental rotation matrices. The matrix to describe rotations about the z, $\dot{y}$ and $\ddot{x}$ axes by the angles α, β and γ, respectively and in that order is defined in equation (1), as follows:

$$R = R_Z(\alpha)R_Y(\beta)R_X(\gamma) = \begin{pmatrix} +\cos\alpha & -\sin\alpha & 0 \\ +\sin\alpha & +\cos\alpha & 0 \\ 0 & 0 & 1 \end{pmatrix} \begin{pmatrix} +\cos\beta & 0 & +\sin\beta \\ 0 & 1 & 0 \\ -\sin\beta & 0 & +\cos\beta \end{pmatrix} \begin{pmatrix} 1 & 0 & 0 \\ 0 & +\cos\gamma & -\sin\gamma \\ 0 & +\sin\gamma & +\cos\gamma \end{pmatrix} \quad (1)$$

The reverse transformation is given by the inverse of R. The inverse of R is equal to the transpose of R, since R is orthogonal.

$$R^{-1} = R_X(-\gamma)R_Y(-\beta)R_Z(-\alpha) = R^T \quad (2)$$

The simplified forward and reverse composite rotation matrices are given in equations (3) and (4).

$$R=\begin{pmatrix}\cos\alpha\cos\beta & \cos\alpha\sin\beta\sin\gamma- & \cos\alpha\sin\beta\cos\gamma+\\ & \sin\alpha\cos\gamma & \sin\alpha\sin\gamma\\ \sin\alpha\cos\beta & \sin\alpha\sin\beta\sin\gamma+ & \sin\alpha\sin\beta\cos\gamma-\\ & \cos\alpha\cos\gamma & \cos\alpha\sin\gamma\\ -\sin\beta & \cos\beta\sin\gamma & \cos\beta\cos\gamma\end{pmatrix} \tag{3}$$

$$R^{-1}=\begin{pmatrix}\cos\alpha\cos\beta & \sin\alpha\cos\beta & -\sin\beta\\ \cos\alpha\sin\beta\sin\gamma- & \sin\alpha\sin\beta\sin\gamma+ & \cos\beta\sin\gamma\\ \sin\alpha\cos\gamma & \cos\alpha\cos\gamma & \\ \cos\alpha\sin\beta\cos\gamma+ & \sin\alpha\sin\beta\cos\gamma- & \cos\beta\cos\gamma\\ \sin\alpha\sin\gamma & \cos\alpha\sin\gamma & \end{pmatrix} \tag{4}$$

These transformations can be used to derive the angular and polarization relationships between the two coordinate systems.

In order to establish the angular relationships, consider a point (x, y, z) on the unit sphere defined by the spherical coordinates (ρ=1,θ,ϕ), where ρ is the unit radius, θ is the zenith angle measured from the +z-axis and ϕ is the azimuth angle measured from the +x-axis in the x-y plane. The Cartesian representation of that point is given by $$\hat{\rho}=\begin{pmatrix}x\\ y\\ z\end{pmatrix}=\begin{pmatrix}\sin\theta\cos\varphi\\ \sin\theta\sin\varphi\\ \cos\theta\end{pmatrix} \tag{5}$$

The zenith angle is computed as $\arccos(\hat{\rho}\cdot\hat{z})$ and the azimuth angle as $\arg(\hat{x}\cdot\hat{\rho}+j\hat{y}\cdot\hat{\rho})$, where $\hat{x}$, $\hat{y}$ and $\hat{z}$ are the Cartesian unit vectors. If this point represents a location in the GCS defined by θ and ϕ, the corresponding position in the LCS is given by $R^{-1}\hat{\rho}$, from which local angles θ' and ϕ' can be computed. The results are given in equations (6) and (7)

$$\theta'(\alpha,\beta,\gamma;\theta,\varphi)=\cos^{-1}\left(\begin{bmatrix}0\\0\\1\end{bmatrix}^T R^{-1}\hat{\rho}\right)= \cos^{-1}(\cos\beta\cos\gamma\cos\alpha+(\sin\beta\cos\gamma\cos(\varphi-\alpha)-\sin\gamma\sin(\varphi-\alpha))\sin\theta) \tag{6}$$

$$\phi'(\alpha,\beta,\gamma;\theta,\varphi)= \arg\left(\begin{bmatrix}1\\j\\0\end{bmatrix}^T R^{-1}\hat{\rho}\right)=\arg\begin{pmatrix}(\cos\beta\sin\theta\cos(\varphi-\alpha)-\sin\beta\cos\theta)+\\ j(\cos\beta\sin\gamma\cos\theta+(\sin\beta\sin\gamma\cos(\varphi-\alpha)+\\ \cos\gamma\sin(\varphi-\alpha))\sin\theta)\end{pmatrix} \tag{7}$$

A beam link between the TRP 170 and the given UE 110 may be defined using various parameters. In the context of the local coordinate system, having the TRP 170 at the origin, the parameters may be defined to include a relative physical angle and an orientation between the TRP 170 and the given UE 110. The relative physical angle, or beam direction "ξ," may be used as one or two of the coordinates for the beam indication. The TRP 170 may use conventional sensing signals to obtain the beam direction, ξ, to associate with the given UE 110.

If the coordinate system is defined by the x, y and z axes, the location "(x,y,z)," of the TRP 170 or the UE 110, may be used as one or two or three of the coordinates for beam indication. The location "(x,y,z)" may be obtained through the use of sensing signals.

The beam direction may contain a value representative of a zenith of an angle of arrival, a value representative of a zenith of an angle of departure, a value representative of an azimuth of an angle of arrival or an azimuth of an angle of departure.

A boresight orientation may be used as one or two of the coordinates for the beam indication. Additionally, a width may be used as one or two of the coordinates for the beam indication.

Location information and orientation information for the TRP 170 may be broadcast to all UEs 110 in communication range of the TRP 170. In particular, the location information for the TRP 170 may be included in the known System Information Block 1 (SIB1). Alternatively, the location information for the TRP 170 may be included as part of a configuration of the given UE 110.

According to the absolute beam indication aspects of the present application, when providing a beam indication to the given UE 110, the TRP may indicate the beam direction, ξ, as defined in the local coordinate system.

In contrast, according to the differential beam indication aspects of the present application, when providing a beam indication to the given UE 110, the TRP may indicate the beam direction using differential coordinates, Δξ, relative to a reference beam direction. Of course, this approach relies on both the TRP 170 and the given UE 110 having been configured with the reference beam direction.

Figure 19:
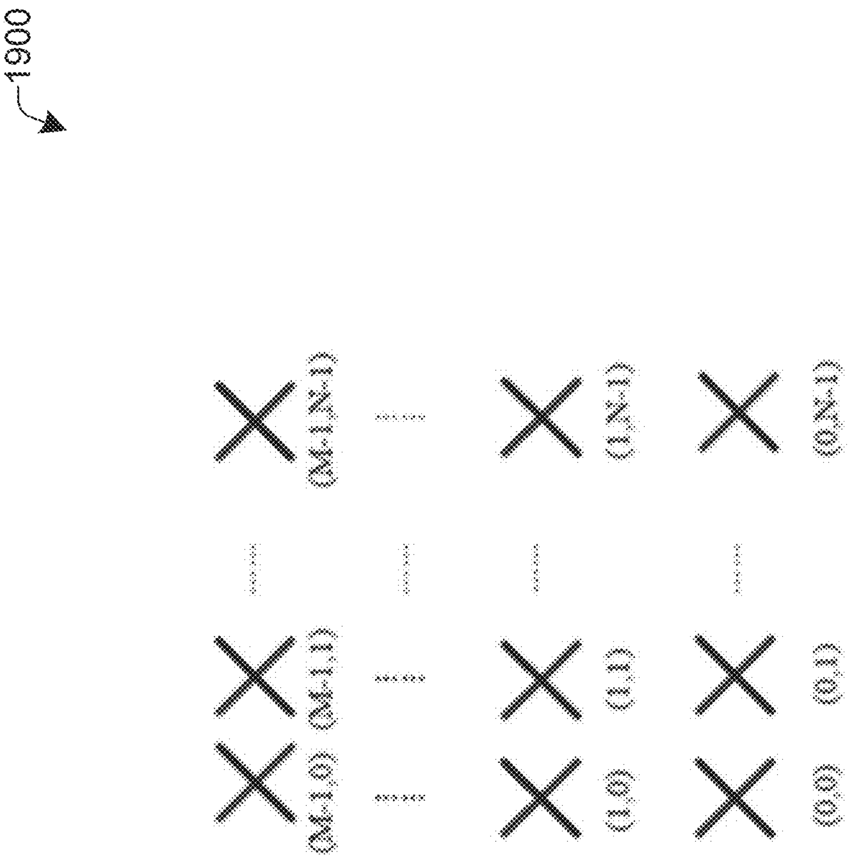
FIG. 19 illustrates a two-dimensional planar antenna array structure of dual-polarized antenna.
Figure 20:
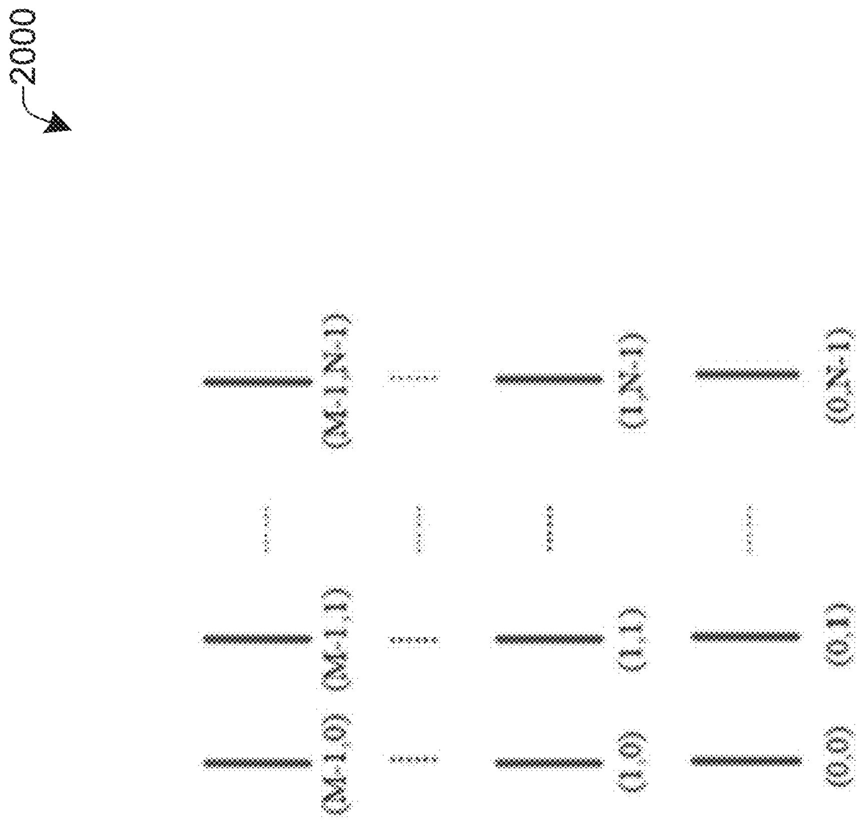
FIG. 20 illustrates a two-dimensional planar antenna array structure of single polarization antenna.

The beam direction could also be defined according to predefined spatial grids. FIG. 19 illustrates a two-dimensional planar antenna array structure 1900 of a dual polarized antenna. FIG. 20 illustrates a two-dimensional planar antenna array structure 2000 of a single polarized antenna. Antenna elements may be placed in vertical and horizontal directions as illustrated in FIGS. 19 and 20, where N is the number of columns and M is the number of antenna elements with the same polarization in each column. The radio channel between the TRP 170 and the UE 110 may be segmented into multiple zones. Alternatively, the physical space between the TRP 170 and the UE 110 may be segmented into 3D zones, wherein multiple spatial zones include the zones in vertical and horizontal directions.

Figure 21:
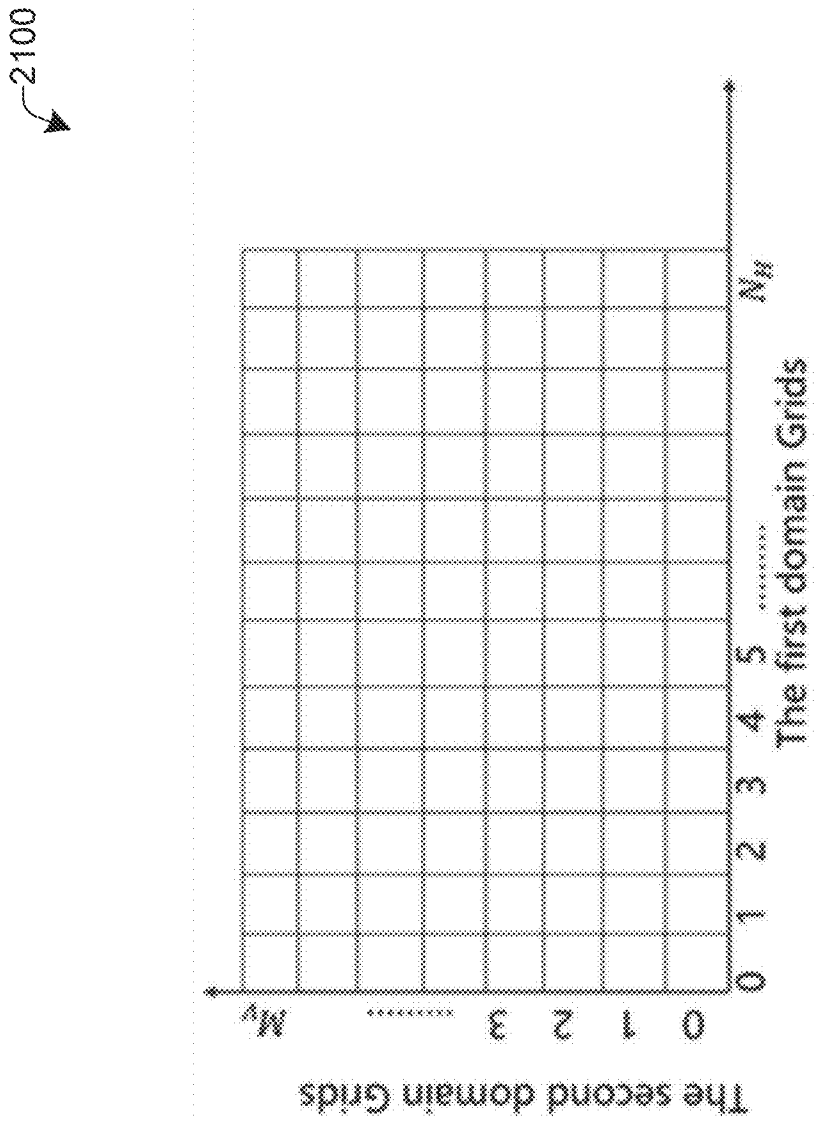
FIG. 21 illustrates a grid of spatial zones, allowing for spatial zones to be indexed.

With reference to a grid 2100 of spatial zones illustrated in FIG. 21, a beam indication may be an index of a spatial zone, for example, the index of the grids. Here $N_H$ can be same or different as the N of the antenna array, $M_V$ could be same or different as the M of the antenna array. For an X-pol antenna array, the beam direction of the two-polarization antenna array can be indicated independently or by a single indication. Each of the grid is corresponding to a vector in column and a vector in row, which are generated by partial or full of the antenna array. Such beam indication in spatial domain may be indicated by the combination of a spatial domain beam and a frequency domain vector. Further, beam indication may be a one-dimensional index of the spatial zone (X-pol antenna array or Y-pol antenna array). In addition, a beam indication may be the three-dimension index of the spatial zone (X-pol antenna array and Y-pol antenna array and Z-pol antenna array).

Figure 22:
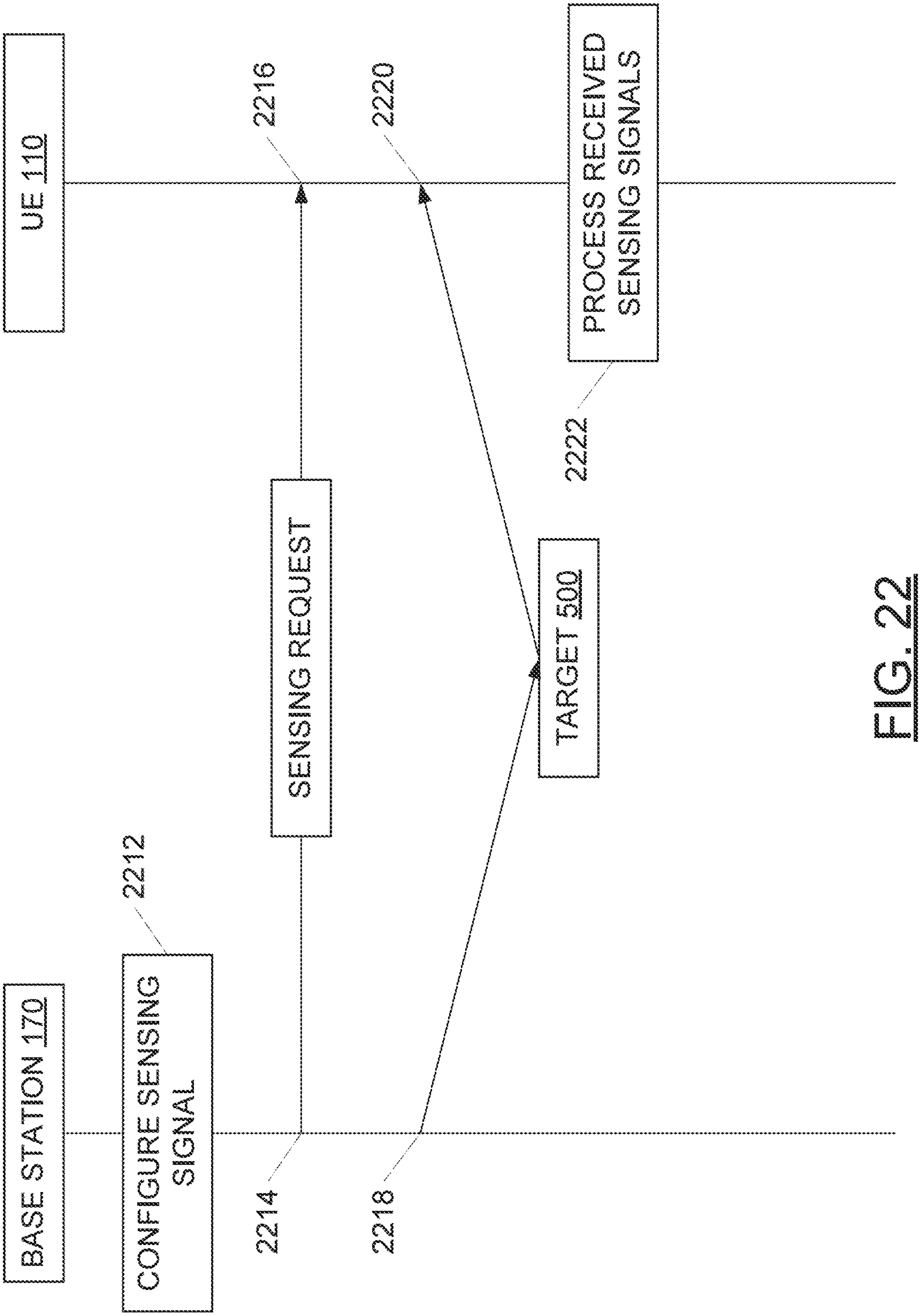
FIG. 22 illustrates, in a signal flow diagram, interaction between a TRP and a UE according to aspects of the present application.

FIG. 22 illustrates, in a signal flow diagram, interaction between a TRP 170 and a UE 110 according to aspects of the present application.

Initially, the TRP 170 configures (step 2212) a sensing signal. The sensing signal configuration may, for example, include a time resource, a frequency resource, triggering mode, some beam information and a time duration. The triggering mode may be periodic, semi-persistent or aperiodic. Additionally, in the case of UL sensing signals, the sensing signal configuration may, for example, include a transmit power.

In a case wherein the TRP 170 operates in a bistatic sensing mode, the TRP 170 transmits (step 2214) a network-initiated sensing request to the UE 110. The network-initiated sensing request may, for example, indicate, to the UE 110, a beam indication for the sensing signal, configured in step 2212, that is to be transmitted by the TRP 170. Upon receiving (step 2216) the sensing request, the UE 110 may adjust a UE sensing signal receive beam direction to align with the TRP sensing signal transmit beam direction.

According to aspects of the present application, a coordinate-based beam indication is used in step 2214. A beam direction included in the beam indication for the sensing signals may be expressed with reference to a communication link (reference direction). Example communication links suitable for use as reference beam direction for downlink sensing signals include: SSB; PDCCH; and PDSCH. The beam direction of sensing signals may be indicated by using differential coordinates. Notably, the sensing signals may be periodic, semi-persistent or aperiodic.

The TRP 170 transmits (step 2218) sensing signals toward a target 500. In some aspects of the present application, the transmitting (step 2218) of TRP sensing signals may involve beam sweeping in an entire sector range. In other aspects of the present application, the transmitting (step 2218) of sensing signals may involve beam sweeping in a restricted directional range. The bounds of the restricted directional range may be based upon reporting (not shown in FIG. 22) received from the UE 110 or a request (not shown in FIG. 22) received from the UE 110.

Upon receiving (step 2220) the sensing signal, using the UE sensing signal receive beam direction, the UE 110 may process (step 2222) the received sensing signals to obtain a possible orientation and a possible position range of the target 500. When processing (step 2222) the received sensing signals, the UE 110 may use AI or other sensing signal processing technology.

Figure 23:
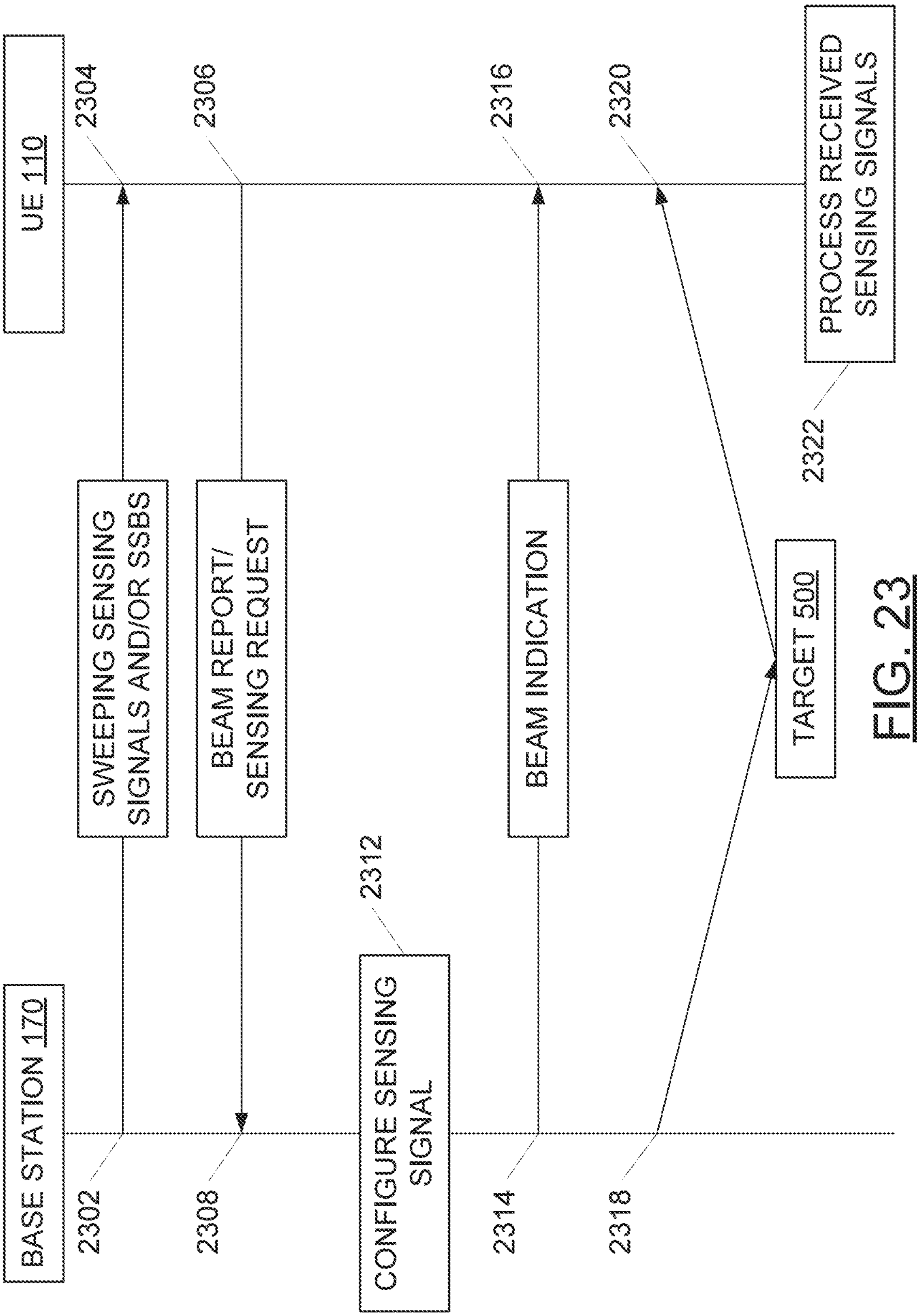
FIG. 23 illustrates, in a signal flow diagram, interaction between a TRP and a UE according to aspects of the present application.

FIG. 23 illustrates, in a signal flow diagram, interaction between a TRP 170 and a UE 110 according to aspects of the present application.

Initially, the TRP 170 transmits (step 2302) a plurality of sensing signals and/or SSBs. The TRP 170 employs beam sweeping to transmit (step 2302) the plurality of sensing signals and/or SSBs. The UE 110 receives (step 2304) the transmission from the TRP 170 and performs measurement.

In a case wherein the TRP 170 is to operate in a bistatic sensing mode, the UE 110 transmits (step 2306) a report indicating a particular preferred beam direction or index. The UE 110 may, for example, use the PUCCH or the PUSCH for the transmission (step 2306) of the report. The particular preferred beam direction or index may be determined on the basis of the measurements and on the basis of a sensing direction determined for sensing the target 500.

In the report transmitted in step 2306, the UE 110 report may specify beam identifier (ID) or beam direction of DL sensing signal, beam identifier (ID) and/or beam direction of reference signal and/or cell ID.

According to aspects of the present application, a coordinate-based beam indication is used in step 2306. A beam direction included in the beam indication for the sensing signals may be expressed with reference to a communication link (reference direction). Example communication links suitable for use as reference beam direction for downlink sensing signals include: SSB; PDCCH; and PDSCH. The beam direction of sensing signals may be indicated by using differential coordinates.

The TRP 170 next configures (step 2312) a sensing signal. The sensing signal configuration may, for example, include a time resource, a frequency resource, triggering mode, some beam information and a time duration. The triggering mode may be periodic, semi-persistent or aperiodic.

It is notable that, in the report transmitted in step 2306, the UE 110 does not report reference signal received power (RSRP). This is one difference between beam reporting for communication purposes and beam reporting for sensing purposes.

The TRP 170 transmits (step 2314), on a communication link to the UE 110, an indication of the beam direction/index of DL sensing signals that have been configured in step 2312. The indication may include DL sensing beam ID, a reference signal ID, a coordinated beam direction and/or a cell ID.

Upon receiving (step 2316) the sensing request, the UE 110 may adjust a UE sensing signal receive beam direction to align with the TRP sensing signal transmit beam direction.

The TRP 170 transmits (step 2318) sensing signals in the configured TRP transmit beam direction and the UE 110 adjusts the sensing signal receive beam direction to align with the TRP transmit beam direction. Sensing signals could be periodic, semi-persistent or aperiodic. The sensing beam transmitted by the TRP 170 may operate in a scanning manner.

In some aspects of the present application, the transmitting (step 2318) of the sensing signals may involve beam sweeping in an entire sector range. In other aspects of the present application, the transmitting (step 2318) of the sensing signals may involve beam sweeping in a restricted directional range. The bounds of the restricted directional range may be based upon reporting/request received (step 2308) from the UE 110.

Upon receiving (step 2320) the sensing signal, using the UE sensing signal receive beam direction, the UE 110 may process (step 2322) the received sensing signals to obtain a possible orientation and a possible position range of the target 500. When processing (step 2322) the received sensing signals, the UE 110 may use AI or other sensing signal processing technology.

Figure 24:
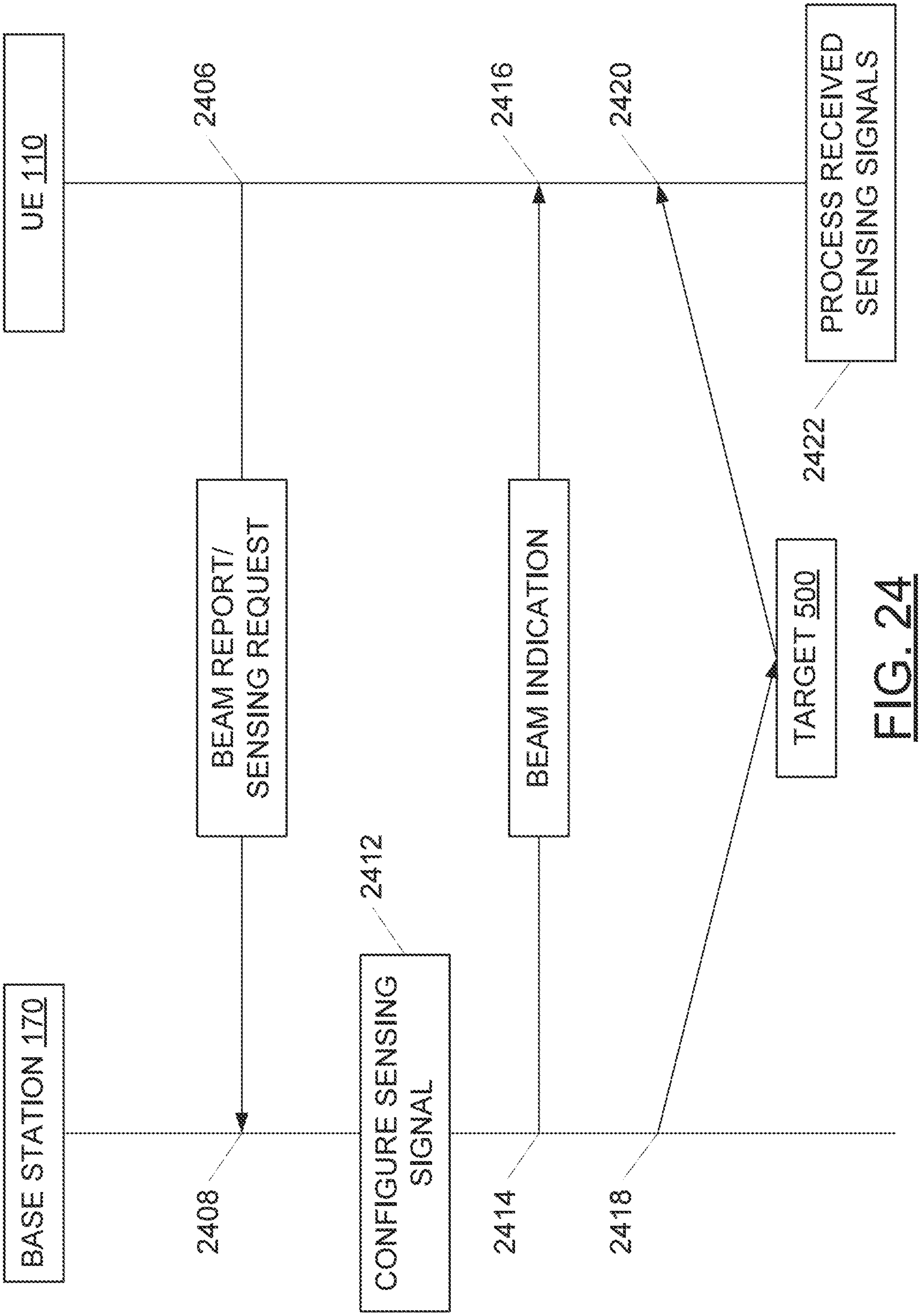
FIG. 24 illustrates, in a signal flow diagram, interaction between a TRP and a UE according to aspects of the present application.

FIG. 24 illustrates, in a signal flow diagram, interaction between a TRP 170 and a UE 110 according to aspects of the present application.

In a case wherein the TRP 170 is to operate in a bistatic sensing mode, the UE 110 transmits (step 2406) a report indicating a particular preferred beam direction or index. The UE 110 may, for example, use the PUCCH or the PUSCH for the transmission (step 2406) of the report. Notably, in the signal flow diagram of FIG. 23, the particular preferred beam direction or index was determined on the basis of the measurements and on the basis of a sensing direction determined for sensing the target 500. In contrast, in the signal flow diagram of FIG. 24, the particular preferred beam direction or index may be determined using sensing and AI technology.

In the report transmitted in step 2406, the UE 110 report may specify beam identifier (ID) or beam direction of DL sensing signal, beam identifier (ID) and/or beam direction of reference signal and/or cell ID.

According to aspects of the present application, a coordinate-based beam indication is used in step 2406. A beam direction included in the beam indication for the sensing signals may be expressed with reference to a communication link (reference direction). Example communication links suitable for use as reference beam direction for downlink sensing signals include: SSB; PDCCH; and PDSCH, CSI-RS, TRS. The beam direction of sensing signals may be indicated by using differential coordinates.

The TRP 170 next configures (step 2412) a sensing signal. The sensing signal configuration may, for example, include a time resource, a frequency resource, triggering mode, some beam information and a time duration. The triggering mode may be periodic, semi-persistent or aperiodic.

It is notable that, in the report transmitted in step 2406, the UE 110 does not report RSRP. This is one difference between beam reporting for communication purposes and beam reporting for sensing purposes.

The TRP 170 next transmits (step 2414), on a communication link to the UE 110, an indication of the beam direction/index of DL sensing signals that have been configured in step 2412. The indication may include DL sensing beam ID, a reference signal ID, a coordinated beam direction and/or a cell ID.

Upon receiving (step 2416) the sensing request, the UE 110 may adjust a UE sensing signal receive beam direction to align with the TRP sensing signal transmit beam direction.

The TRP 170 transmits (step 2418) sensing signals in the configured TRP transmit beam direction and the UE 110 adjusts the sensing signal receive beam direction to align with the TRP transmit beam direction. Sensing signals could be periodic, semi-persistent or aperiodic. The sensing beam transmitted by the TRP 170 may operate in a scanning manner.

In some aspects of the present application, the transmitting (step 2418) of the sensing signals may involve beam sweeping in an entire sector range. In other aspects of the present application, the transmitting (step 2418) of sensing signals may involve beam sweeping in a restricted directional range. The bounds of the restricted directional range may be based upon reporting/request received (step 2408) from the UE 110.

Upon receiving (step 2420) the sensing signal, using the UE sensing signal receive beam direction, the UE 110 may process (step 2422) the received sensing signals to obtain a possible orientation and a possible position range of the target 500. When processing (step 2422) the received sensing signals, the UE 110 may use AI or other sensing signal processing technology.

In the signal flow diagram of FIG. 24, identification of the downlink sensing beam direction is determined using sensing and AI technology instead of beam sweeping. Accordingly, the latency and overhead associated with the identification of the downlink sensing beam direction can be reduced.

Figure 25:
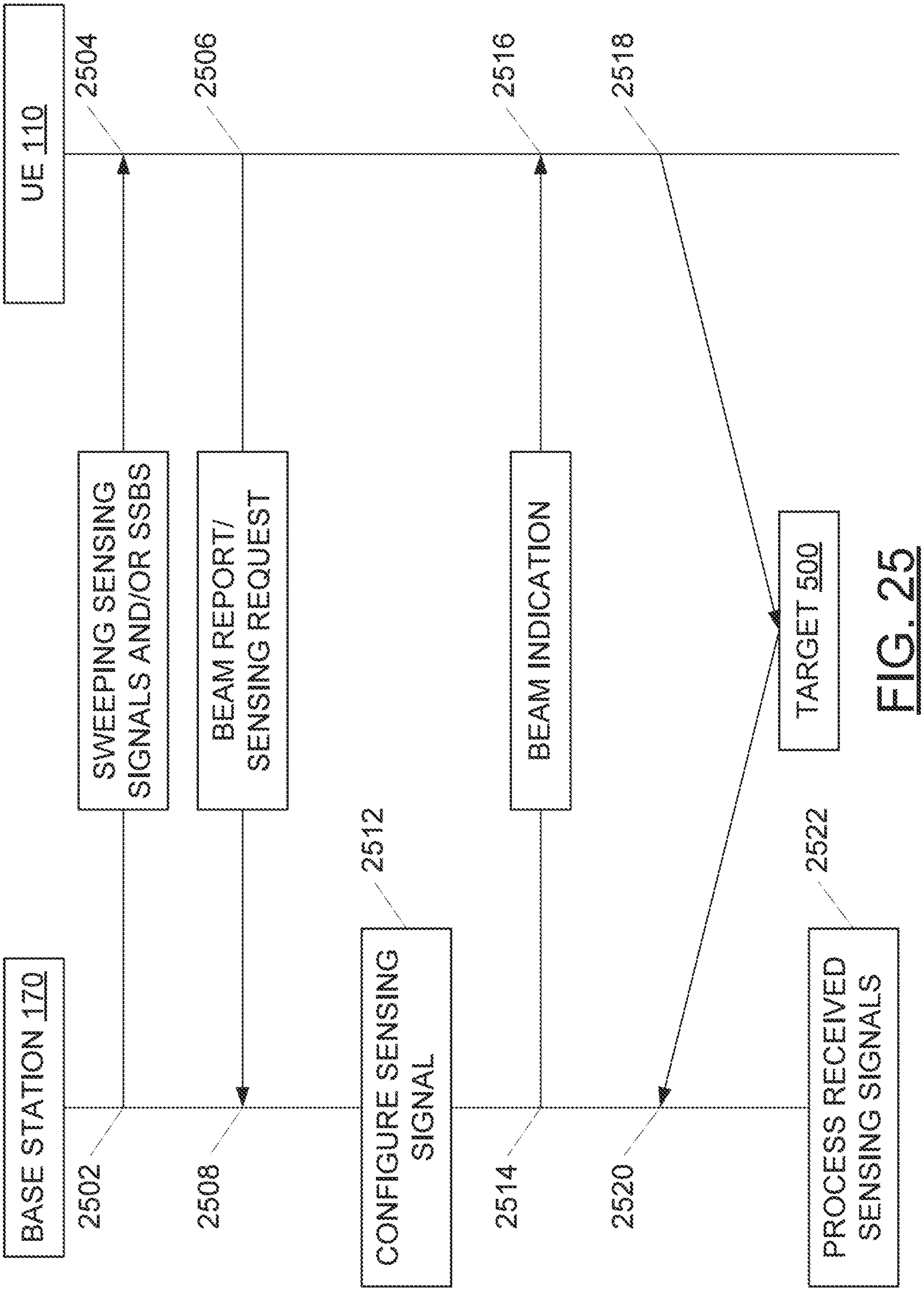
FIG. 25 illustrates, in a signal flow diagram, interaction between a TRP and a UE according to aspects of the present application.

FIG. 25 illustrates, in a signal flow diagram, interaction between a TRP 170 and a UE 110 according to aspects of the present application.

Initially, the TRP 170 transmits (step 2502) a plurality of sensing signals and/or SSBs. The TRP 170 employs beam sweeping to transmit (step 2502) the plurality of sensing signals and/or SSBs. The UE 110 receives (step 2504) the transmission from the TRP 170 and performs measurement.

In a case wherein the TRP 170 is to operate in a bistatic sensing mode, the UE 110 transmits (step 2506) a report indicating a particular preferred beam direction or index. The UE 110 may, for example, use the PUCCH or the PUSCH for the transmission (step 2506) of the report. The particular preferred beam direction or index may be determined on the basis of the measurements and on the basis of a sensing direction determined for sensing the target 500.

In the report transmitted in step 2506, the UE 110 report may specify beam identifier (ID) or beam direction of DL sensing signal, beam identifier (ID) and/or beam direction of reference signal and/or cell ID.

According to aspects of the present application, a coordinate-based beam indication is used in step 2506. A beam direction included in the beam indication for the sensing signals may be expressed with reference to a communication link (reference direction). Example communication links suitable for use as reference beam direction for uplink sensing signals include: PRACH; PUCCH; PUSCH; and SRS. The beam direction of sensing signals may be indicated by using differential coordinates.

The TRP 170 next configures (step 2512) a sensing signal. The sensing signal configuration may, for example, include a time resource, a frequency resource, triggering mode, some beam information and a time duration. The triggering mode may be periodic, semi-persistent or aperiodic. Additionally, in the case of UL sensing signals, the sensing signal configuration may, for example, include a reference transmit power.

Specially, the reference transmit power enables a DL RS from a neighboring cell to serve as a reference for pathloss estimation at the UE 110 so that the UE 110 may adjust the UL transmit power of the sensing signals.

It is notable that, in the report transmitted in step 2506, the UE 110 does not report RSRP. This is one difference between beam reporting for communication purposes and beam reporting for sensing purposes.

The TRP 170 next transmits (step 2514), on a communication link to the UE 110, an indication of the beam direction/index of a sensing signal receive beam that has been configured in step 2512. The indication may include beam identifier (ID) or beam direction of DL sensing signal, beam identifier (ID) and/or beam direction of reference signal and/or cell ID.

Upon receiving (step 2516) indication of the sensing signal receive beam direction/index, the UE 110 may derive a UE transmit beam direction based on beam reciprocity and the indicated sensing signal receive beam direction/index.

The UE 110 transmits (step 2518) sensing signals in the derived UE transmit beam direction. The sensing signals could be periodic, semi-persistent or aperiodic.

In some aspects of the present application, the transmitting (step 2518) of the sensing signals may involve beam sweeping in an entire sector range. In other aspects of the present application, the transmitting (step 2518) of sensing signals may involve beam sweeping in a restricted directional range. The bounds of the restricted directional range may be based upon reporting/request transmitted (step 2508) from the UE 110.

Upon receiving (step 2520) the sensing signal, using the TRP sensing signal receive beam direction, the TRP 170 may process (step 2522) the received sensing signals to obtain a possible orientation and a possible position range of the target 500. When processing (step 2522) the received sensing signals, the UE 110 may use AI or other sensing signal processing technology.

Figure 26:
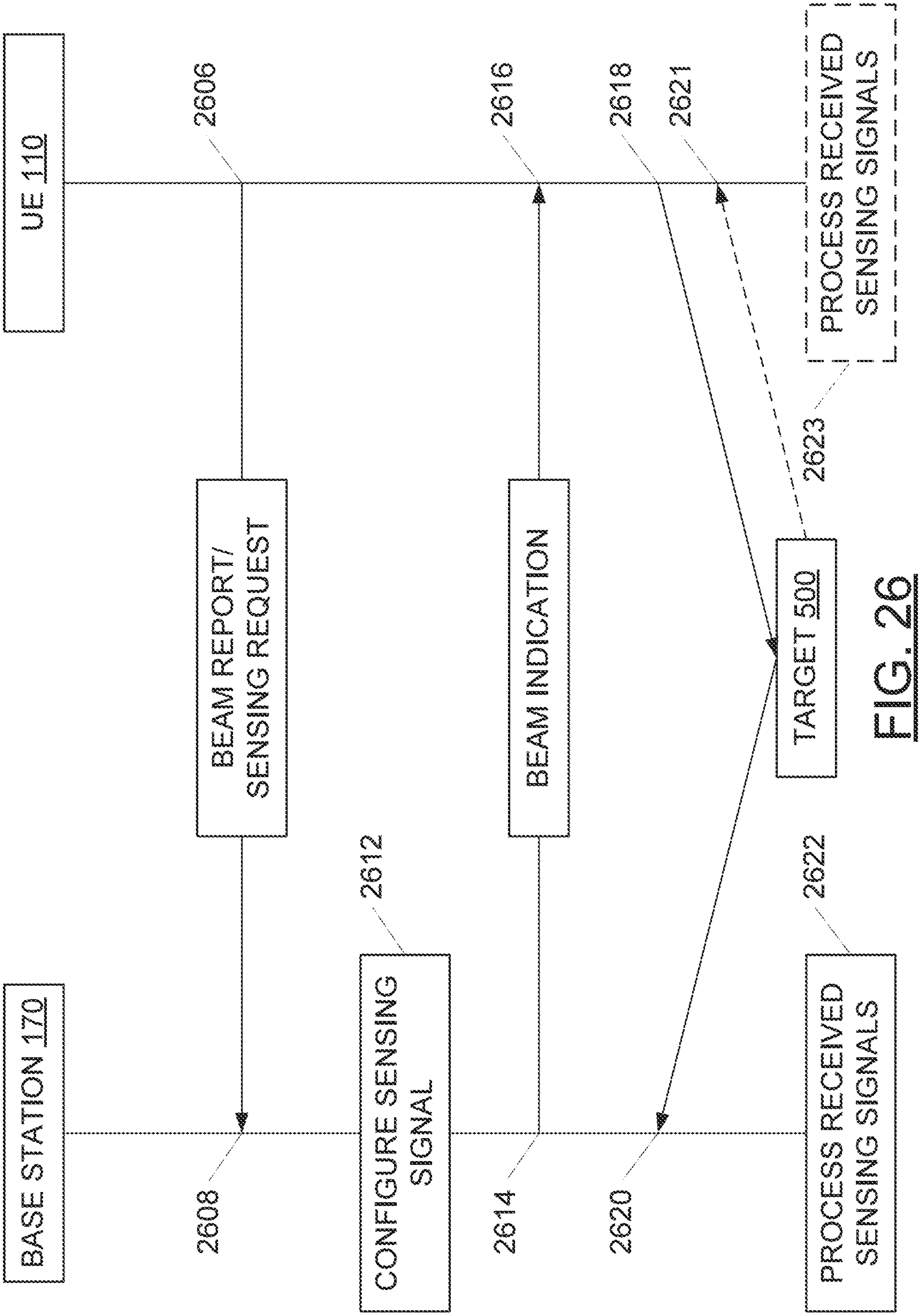
FIG. 26 illustrates, in a signal flow diagram, interaction between a TRP and a UE according to aspects of the present application.

FIG. 26 illustrates, in a signal flow diagram, interaction between a TRP 170 and a UE 110 according to aspects of the present application.

In signal flow diagram of FIG. 26, the TRP 170 may operate in a bistatic sensing mode and the UE 110 may operate in a monostatic sensing mode.

Initially, the UE 110 transmits (step 2606) a report indicating a particular preferred beam direction or index. The UE 110 may, for example, use the PUCCH or the PUSCH for the transmission (step 2606) of the report. Notably, in the signal flow diagram of FIG. 25, the particular preferred beam direction or index was determined on the basis of the measurements and on the basis of a sensing direction determined for sensing the target 500. In contrast, in the signal flow diagram of FIG. 26, the particular preferred beam direction or index may be determined using sensing and AI technology.

In the report transmitted in step 2606, the UE 110 report may specify beam identifier (ID) or beam direction of DL sensing signal, beam identifier (ID) and/or beam direction of reference signal and/or cell ID.

According to aspects of the present application, a coordinate-based beam indication is used in step 2606. A beam direction included in the beam indication for the sensing signals may be expressed with reference to a communication link (reference direction). Example communication links suitable for use as reference beam direction for uplink sensing signals include: PRACH; PUCCH; PUSCH; and SRS. The beam direction of sensing signals may be indicated by using differential coordinates.

The TRP 170 next configures (step 2612) a sensing signal. The sensing signal configuration may, for example, include a time resource, a frequency resource, triggering mode, some beam information and a time duration. The triggering mode may be periodic, semi-persistent or aperiodic. Additionally, in the case of UL sensing signals, the sensing signal configuration may, for example, include a reference transmit power.

Specially, the reference transmit power enables a DL RS from a neighboring cell to serve as a reference for pathloss estimation at the UE 110 so that the UE 110 may adjust the UL transmit power of the sensing signals.

It is notable that, in the report transmitted in step 2606, the UE 110 does not report RSRP. This is one difference between beam reporting for communication purposes and beam reporting for sensing purposes.

The TRP 170 next transmits (step 2614), on a communication link to the UE 110, an indication of the beam direction/index of a sensing signal receive beam that has been configured in step 2612. The indication may include beam identifier (ID) or beam direction of DL sensing signal, beam identifier (ID) and/or beam direction of reference signal and/or cell ID.

Upon receiving (step 2616) indication of the sensing signal receive beam direction/index, the UE 110 may derive a UE transmit beam direction based on beam reciprocity and the indicated sensing signal receive beam direction/index.

The UE 110 transmits (step 2618) sensing signals in the derived UE transmit beam direction. The sensing signals could be periodic, semi-persistent or aperiodic.

In some aspects of the present application, the transmitting (step 2618) of the sensing signals may involve beam sweeping in an entire sector range. In other aspects of the present application, the transmitting (step 2618) of sensing signals may involve beam sweeping in a restricted directional range. The bounds of the restricted directional range may be based upon reporting/request transmitted (step 2608) from the UE 110.

For the case in which the TRP 170 operates in a bistatic sensing mode, upon receiving (step 2620) the sensing signal, using the TRP sensing signal receive beam direction, the TRP 170 may process (step 2622) the received sensing signals to obtain a possible orientation and a possible position range of the target 500. When processing (step 2622) the received sensing signals, the UE 110 may use AI or other sensing signal processing technology.

For the case in which the UE 110 operates in a monostatic sensing mode, upon receiving (step 2621) the sensing signal, using the TRP sensing signal receive beam direction, the UE 110 may process (step 2623) the received sensing signals to obtain a possible orientation and a possible position range of the target 500. When processing (step 2623) the received sensing signals, the UE 110 may use AI or other sensing signal processing technology.

Conveniently, aspects of the present application relate to low-latency, low-overhead configuration of the beam direction of sensing signals. Once a beam direction has been configured, it is typically useful to indicate the beam direction to another device. The beam direction schemes used in aspects of the present application may be shown to be low-latency, low-overhead, direct and agile.

Through the use of AI or sensing technology, obtaining the possible orientation and position range of a given target need not involve sweeping a whole range of angles, since the sensing target probably locates in some sub-directions. Again, a result is a reduction in latency and overhead.

Compared with NR beam reporting, aspects of the present application obviate the reporting of RSRP, thereby reducing overhead.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

receiving a sensing request, the sensing request including an indication of a beam direction for a sensing signal, the beam direction for the sensing signal being indicated using coordinate information, the coordinate information expressed relative to a predefined coordinate system, wherein the indication of the beam direction comprises an explicit indication of the beam direction or an indication of a beam index; and receiving the sensing signal transmitted using the beam direction.

2. The method of claim 1, further comprising transmitting a beam report, wherein the beam report includes an indication of a beam.

3. The method of claim 2, further comprising:

receiving sweeping sensing signals, wherein the indication of the beam is based on measuring the sweeping sensing signals.

4. The method of claim 2, further comprising:

receiving sweeping synchronization signal blocks, wherein the indication of the beam is based on measuring the sweeping synchronization signal blocks.

5. The method of claim 1, further comprising processing the sensing signal.

6. The method of claim 5, wherein a result of the processing comprises a position for a target or an orientation for the target.

7. The method of claim 5, wherein the processing comprises employing artificial intelligence.

8. The method of claim 1, wherein the coordinate information comprises differential coordinates expressed relative to a reference beam direction.

9. A device comprising:

a memory storing instructions; and at least one processor configured, by executing the instructions, to:

receive a sensing request, the sensing request including an indication of a beam direction for a sensing signal, the beam direction for the sensing signal being indicated using coordinate information, the coordinate information expressed relative to a predefined coordinate system, wherein the indication of the beam direction comprises an explicit indication of the beam direction or an indication of a beam index; and receive the sensing signal transmitted using the beam direction.

10. The device of claim 9, wherein the at least one processor is further configured, by executing the instructions, to transmit a beam report, and wherein the beam report includes an indication of a beam.

11. The device of claim 10, wherein the at least one processor is further configured, by executing the instructions, to:

receive sweeping sensing signals, wherein the indication of the beam is based on measuring the sweeping sensing signals.

12. A method comprising:

receiving, by a user equipment (UE), sweeping sensing signals or sweeping synchronization signal blocks;

receiving, by the UE, a sensing request, the sensing request including an indication of a downlink beam direction for a downlink sensing signal, the downlink beam direction of the downlink sensing signal being indicated using coordinate information, the coordinate information expressed relative to a predefined coordinate system, wherein the indication of the downlink beam direction is based on measuring the sweeping sensing signals or the sweeping synchronization signal blocks; and transmitting, by the UE, an uplink sensing signal transmitted using an uplink beam direction, the uplink beam direction derived from the downlink beam direction.

13. The method of claim 12, further comprising transmitting a beam report, wherein the beam report includes an indication of a beam.

14. The method of claim 13, wherein the indication of the beam comprises an indication of a beam index.

15. The method of claim 12, wherein the coordinate information comprises differential coordinates expressed relative to a reference beam direction.

16. A device comprising:

a memory storing instructions; and at least one processor configured, by executing the instructions, to:

receive sweeping sensing signals or sweeping synchronization signal blocks;

receive a sensing request, the sensing request including an indication of a downlink beam direction for a downlink sensing signal, the downlink beam direction of the downlink sensing signal being indicated using coordinate information, the coordinate information expressed relative to a predefined coordinate system, wherein the indication of the downlink beam direction is based on measuring the sweeping sensing signals or the sweeping synchronization signal blocks; and transmit an uplink sensing signal transmitted using an uplink beam direction, the uplink beam direction derived from the downlink beam direction.

* * * * *